United States Patent
Zhang et al.

(10) Patent No.: US 11,962,754 B2
(45) Date of Patent: Apr. 16, 2024

(54) CONDITIONS FOR STARTING CHECKING HMVP CANDIDATES DEPEND ON TOTAL NUMBER MINUS K

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/338,054

(22) Filed: Jun. 3, 2021

(65) Prior Publication Data
US 2021/0297659 A1    Sep. 23, 2021

Related U.S. Application Data

(63) Continuation of application No. 17/018,200, filed on Sep. 11, 2020, now Pat. No. 11,159,787, which is a
(Continued)

(30) Foreign Application Priority Data

Sep. 12, 2018    (WO) ................ PCT/CN2018/105193

(51) Int. Cl.
*H04N 19/176*    (2014.01)
*H04N 19/105*    (2014.01)
(Continued)

(52) U.S. Cl.
CPC ......... *H04N 19/105* (2014.11); *H04N 19/176* (2014.11); *H04N 19/184* (2014.11); *H04N 19/46* (2014.11)

(58) Field of Classification Search
CPC .... H04N 19/105; H04N 19/184; H04N 19/46; H04N 19/176; H04N 19/70; H04N 19/52
See application file for complete search history.

(56) References Cited

U.S. PATENT DOCUMENTS

| 7,023,922 | B1 | 4/2006 | Xu et al. |
| 7,653,134 | B2 | 1/2010 | Xu et al. |

(Continued)

FOREIGN PATENT DOCUMENTS

| AU | 2019293670 B2 | 1/2021 |
| CN | 1898715 A | 1/2007 |

(Continued)

OTHER PUBLICATIONS

Chen et al. "Algorithm Description for Versatile Video Coding and Terst Model 3 (VTM 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1002, 2018.

(Continued)

*Primary Examiner* — Dave Czekaj
*Assistant Examiner* — Berteau Joisil
(74) *Attorney, Agent, or Firm* — Perkins Coie LLP

(57) ABSTRACT

A method of video decoding includes checking one or more video blocks in pre-defined relative positions compared to a first video block to derive a first set of candidates, wherein each of the first set of candidates is derived from corresponding motion information of the video blocks checked, checking, upon a determination that a number of the first set of candidates has not reached a predetermined limit, one or
(Continued)

multiple tables to derive a second set of candidates, and processing the first video block based on a bitstream representation of the first video block and the constructed candidate list.

25 Claims, 35 Drawing Sheets

Related U.S. Application Data continuation of application No. PCT/IB2019/057690, filed on Sep. 12, 2019.

(51) Int. Cl.
*H04N 19/184* (2014.01)
*H04N 19/46* (2014.01)

(56) References Cited

U.S. PATENT DOCUMENTS

| | | |
|---|---|---|
| 7,675,976 B2 | 3/2010 | Xu et al. |
| 7,680,189 B2 | 3/2010 | Xu et al. |
| 7,680,190 B2 | 3/2010 | Xu et al. |
| 7,801,220 B2 | 9/2010 | Zhang et al. |
| 8,804,816 B2 | 8/2014 | Li et al. |
| 9,350,970 B2 | 5/2016 | Kang et al. |
| 9,445,076 B2 | 9/2016 | Zhang et al. |
| 9,485,503 B2 | 11/2016 | Zhang et al. |
| 9,503,702 B2 | 11/2016 | Chen et al. |
| 9,621,888 B2 | 4/2017 | Jeon et al. |
| 9,667,996 B2 | 5/2017 | Chen et al. |
| 9,699,450 B2 | 7/2017 | Zhang et al. |
| 9,762,882 B2 | 9/2017 | Zhang et al. |
| 9,762,900 B2 | 9/2017 | Park et al. |
| 9,807,431 B2 | 10/2017 | Hannuksela et al. |
| 9,872,016 B2 | 1/2018 | Chuang et al. |
| 9,900,615 B2 | 2/2018 | Li et al. |
| 9,918,102 B1 | 3/2018 | Kohn et al. |
| 9,998,727 B2 | 6/2018 | Zhang et al. |
| 10,021,414 B2 | 7/2018 | Seregin et al. |
| 9,967,592 B2 | 9/2018 | Zhang et al. |
| 10,085,041 B2 | 9/2018 | Zhang et al. |
| 10,116,934 B2 | 10/2018 | Zan et al. |
| 10,154,286 B2 | 12/2018 | He et al. |
| 10,158,876 B2 | 12/2018 | Chen et al. |
| 10,200,709 B2 | 2/2019 | Chen et al. |
| 10,200,711 B2 | 2/2019 | Li et al. |
| 10,230,980 B2 | 3/2019 | Liu et al. |
| 10,271,064 B2 | 4/2019 | Chien et al. |
| 10,277,909 B2 | 4/2019 | Ye et al. |
| 10,284,869 B2 | 5/2019 | Han et al. |
| 10,306,225 B2 | 5/2019 | Zhang et al. |
| 10,349,083 B2 | 7/2019 | Chen et al. |
| 10,362,330 B1 | 7/2019 | Li et al. |
| 10,368,072 B2 | 7/2019 | Zhang et al. |
| 10,390,029 B2 | 8/2019 | Ye et al. |
| 10,440,378 B1 | 10/2019 | Xu et al. |
| 10,448,010 B2 | 10/2019 | Chen et al. |
| 10,462,439 B2 | 10/2019 | He et al. |
| 10,491,902 B1 | 11/2019 | Xu et al. |
| 10,491,917 B2 | 11/2019 | Chen et al. |
| 10,531,118 B2 | 1/2020 | Li et al. |
| 10,560,718 B2 | 2/2020 | Lee et al. |
| 10,595,035 B2 | 3/2020 | Karczewicz et al. |
| 10,681,383 B2 | 6/2020 | Ye et al. |
| 10,687,077 B2 | 6/2020 | Zhang et al. |
| 10,694,204 B2 | 6/2020 | Chen et al. |
| 10,701,366 B2 | 6/2020 | Chen et al. |
| 10,771,811 B2 | 9/2020 | Liu et al. |
| 10,778,997 B2 | 9/2020 | Zhang et al. |
| 10,778,999 B2 | 9/2020 | Li et al. |
| 10,805,650 B2 | 10/2020 | Wang et al. |
| 10,812,791 B2 | 10/2020 | Chien et al. |
| 10,841,615 B2 | 11/2020 | He et al. |
| 10,873,756 B2 | 11/2020 | Zhang et al. |
| 10,911,769 B2 | 2/2021 | Zhang et al. |
| 11,134,243 B2 | 9/2021 | Zhang et al. |
| 11,134,244 B2 | 9/2021 | Zhang et al. |
| 11,134,267 B2 | 9/2021 | Zhang et al. |
| 11,140,383 B2 | 10/2021 | Zhang et al. |
| 11,140,385 B2 | 10/2021 | Zhang et al. |
| 11,146,785 B2 | 10/2021 | Zhang et al. |
| 11,146,786 B2 | 10/2021 | Zhang et al. |
| 11,153,557 B2 | 10/2021 | Zhang et al. |
| 11,153,558 B2 | 10/2021 | Zhang et al. |
| 11,153,559 B2 | 10/2021 | Zhang et al. |
| 11,159,787 B2 | 10/2021 | Zhang et al. |
| 11,159,807 B2 | 10/2021 | Zhang et al. |
| 11,159,817 B2 | 10/2021 | Zhang et al. |
| 11,245,892 B2 | 2/2022 | Zhang et al. |
| 11,412,211 B2 | 8/2022 | Lee |
| 11,463,685 B2 | 10/2022 | Zhang et al. |
| 11,528,500 B2 | 12/2022 | Zhang et al. |
| 11,528,501 B2 | 12/2022 | Zhang et al. |
| 11,589,071 B2 | 2/2023 | Zhang et al. |
| 11,641,483 B2 | 5/2023 | Zhang et al. |
| 11,695,921 B2 | 7/2023 | Zhang et al. |
| 11,706,406 B2 | 7/2023 | Zhang et al. |
| 2005/0105812 A1 | 5/2005 | Molino et al. |
| 2006/0233243 A1 | 10/2006 | Ridge et al. |
| 2007/0025444 A1 | 2/2007 | Okada et al. |
| 2009/0180538 A1 | 7/2009 | Visharam et al. |
| 2010/0080296 A1 | 4/2010 | Lee et al. |
| 2011/0109964 A1 | 5/2011 | Kim et al. |
| 2011/0116546 A1 | 5/2011 | Guo et al. |
| 2011/0170600 A1 | 7/2011 | Ishikawa |
| 2011/0194608 A1 | 8/2011 | Rusert et al. |
| 2011/0194609 A1 | 8/2011 | Rusert et al. |
| 2011/0200107 A1 | 8/2011 | Ryu |
| 2012/0082229 A1 | 4/2012 | Su et al. |
| 2012/0134415 A1 | 5/2012 | Lin et al. |
| 2012/0195366 A1 | 8/2012 | Liu et al. |
| 2012/0195368 A1 | 8/2012 | Chien et al. |
| 2012/0257678 A1 | 10/2012 | Zhou et al. |
| 2012/0263231 A1 | 10/2012 | Zhou |
| 2012/0287999 A1 | 11/2012 | Li et al. |
| 2012/0300846 A1 | 11/2012 | Sugio et al. |
| 2012/0307903 A1 | 12/2012 | Sugio et al. |
| 2012/0320984 A1 | 12/2012 | Zhou |
| 2013/0064301 A1 | 3/2013 | Guo et al. |
| 2013/0070855 A1 | 3/2013 | Zheng et al. |
| 2013/0094580 A1 | 4/2013 | Zhou et al. |
| 2013/0101041 A1 | 4/2013 | Fishwick et al. |
| 2013/0114717 A1 | 5/2013 | Zheng et al. |
| 2013/0114723 A1 | 5/2013 | Bici et al. |
| 2013/0128982 A1 | 5/2013 | Kim et al. |
| 2013/0163668 A1 | 6/2013 | Chen et al. |
| 2013/0188013 A1 | 7/2013 | Chen et al. |
| 2013/0188715 A1 | 7/2013 | Seregin et al. |
| 2013/0208799 A1 | 8/2013 | Srinivasamurthy et al. |
| 2013/0243093 A1 | 9/2013 | Chen et al. |
| 2013/0265388 A1 | 10/2013 | Zhang et al. |
| 2013/0272377 A1 | 10/2013 | Karczewicz et al. |
| 2013/0272410 A1 | 10/2013 | Seregin et al. |
| 2013/0272412 A1 | 10/2013 | Seregin et al. |
| 2013/0272413 A1 | 10/2013 | Seregin et al. |
| 2013/0301734 A1 | 11/2013 | Gisquet et al. |
| 2013/0336406 A1 | 12/2013 | Zhang et al. |
| 2014/0064372 A1 | 3/2014 | Laroche et al. |
| 2014/0078251 A1 | 3/2014 | Kang et al. |
| 2014/0086327 A1 | 3/2014 | Ugur et al. |
| 2014/0105295 A1 | 4/2014 | Shiodera et al. |
| 2014/0105302 A1 | 4/2014 | Takehara et al. |
| 2014/0126629 A1 | 5/2014 | Park et al. |
| 2014/0133558 A1 | 5/2014 | Seregin et al. |
| 2014/0161186 A1 | 6/2014 | Zhang et al. |
| 2014/0185685 A1 | 7/2014 | Asaka et al. |
| 2014/0219356 A1 | 8/2014 | Nishitani et al. |
| 2014/0241434 A1 | 8/2014 | Lin et al. |
| 2014/0286427 A1 | 9/2014 | Fukushima et al. |
| 2014/0286433 A1 | 9/2014 | He et al. |
| 2014/0334557 A1 | 11/2014 | Schierl et al. |
| 2014/0341289 A1 | 11/2014 | Schwarz et al. |

(56) References Cited

U.S. PATENT DOCUMENTS

| | | |
|---|---|---|
| 2014/0355685 A1 | 12/2014 | Chen et al. |
| 2014/0376614 A1 | 12/2014 | Fukushima et al. |
| 2014/0376626 A1 | 12/2014 | Lee |
| 2014/0376638 A1 | 12/2014 | Nakamura et al. |
| 2015/0085932 A1 | 3/2015 | Lin et al. |
| 2015/0110197 A1 | 4/2015 | Kim et al. |
| 2015/0189313 A1 | 7/2015 | Shimada et al. |
| 2015/0195558 A1 | 7/2015 | Kim |
| 2015/0256853 A1 | 9/2015 | Li et al. |
| 2015/0264386 A1 | 9/2015 | Pang et al. |
| 2015/0281733 A1 | 10/2015 | Fu et al. |
| 2015/0312588 A1 | 10/2015 | Yamamoto et al. |
| 2015/0326880 A1 | 11/2015 | He et al. |
| 2015/0341635 A1 | 11/2015 | Seregin et al. |
| 2015/0358635 A1 | 12/2015 | Xiu et al. |
| 2016/0044332 A1 | 2/2016 | Maaninen |
| 2016/0050430 A1 | 2/2016 | Xiu et al. |
| 2016/0219278 A1 | 7/2016 | Chen et al. |
| 2016/0227214 A1 | 8/2016 | Rapaka et al. |
| 2016/0234492 A1 | 8/2016 | Li et al. |
| 2016/0241867 A1 | 8/2016 | Sugio et al. |
| 2016/0277761 A1 | 9/2016 | Li et al. |
| 2016/0286230 A1 | 9/2016 | Li et al. |
| 2016/0286232 A1 | 9/2016 | Li et al. |
| 2016/0295240 A1 | 10/2016 | Kim et al. |
| 2016/0301936 A1 | 10/2016 | Chen et al. |
| 2016/0330471 A1 | 11/2016 | Zhu et al. |
| 2016/0337661 A1 | 11/2016 | Pang et al. |
| 2016/0366416 A1 | 12/2016 | Liu et al. |
| 2016/0366442 A1 | 12/2016 | Liu et al. |
| 2016/0373784 A1 | 12/2016 | Bang et al. |
| 2017/0006302 A1 | 1/2017 | Lee et al. |
| 2017/0013269 A1 | 1/2017 | Kim et al. |
| 2017/0048550 A1 | 2/2017 | Hannuksela |
| 2017/0054996 A1 | 2/2017 | Xu et al. |
| 2017/0078699 A1 | 3/2017 | Park et al. |
| 2017/0099495 A1 | 4/2017 | Rapaka et al. |
| 2017/0127082 A1 | 5/2017 | Chen et al. |
| 2017/0127086 A1 | 5/2017 | Lai et al. |
| 2017/0150168 A1 | 5/2017 | Nakamura et al. |
| 2017/0163999 A1 | 6/2017 | Li et al. |
| 2017/0188045 A1 | 6/2017 | Zhou et al. |
| 2017/0214932 A1 | 7/2017 | Huang et al. |
| 2017/0223352 A1 | 8/2017 | Kim et al. |
| 2017/0238005 A1 | 8/2017 | Chien et al. |
| 2017/0238011 A1 | 8/2017 | Pettersson et al. |
| 2017/0264895 A1 | 9/2017 | Takehara et al. |
| 2017/0272746 A1 | 9/2017 | Sugio et al. |
| 2017/0280159 A1 | 9/2017 | Xu et al. |
| 2017/0289570 A1 | 10/2017 | Zhou et al. |
| 2017/0332084 A1 | 11/2017 | Seregin et al. |
| 2017/0332095 A1 | 11/2017 | Zou et al. |
| 2017/0332099 A1 | 11/2017 | Lee et al. |
| 2017/0339425 A1 | 11/2017 | Jeong et al. |
| 2018/0014017 A1 | 1/2018 | Li et al. |
| 2018/0041769 A1 | 2/2018 | Chuang et al. |
| 2018/0070100 A1 | 3/2018 | Chen et al. |
| 2018/0077417 A1 | 3/2018 | Huang |
| 2018/0098063 A1 | 4/2018 | Chen et al. |
| 2018/0184085 A1 | 6/2018 | Yang et al. |
| 2018/0192069 A1 | 7/2018 | Chen et al. |
| 2018/0192071 A1 | 7/2018 | Chuang et al. |
| 2018/0242024 A1 | 8/2018 | Chen et al. |
| 2018/0262753 A1 | 9/2018 | Sugio et al. |
| 2018/0278949 A1 | 9/2018 | Karczewicz et al. |
| 2018/0310018 A1 | 10/2018 | Guo et al. |
| 2018/0332284 A1 | 11/2018 | Liu et al. |
| 2018/0332312 A1 | 11/2018 | Liu et al. |
| 2018/0343467 A1 | 11/2018 | Lin |
| 2018/0352223 A1 | 12/2018 | Chen et al. |
| 2018/0359483 A1* | 12/2018 | Chen .................. H04N 19/70 |
| 2018/0376149 A1 | 12/2018 | Zhang et al. |
| 2018/0376160 A1 | 12/2018 | Zhang et al. |
| 2018/0376164 A1 | 12/2018 | Zhang et al. |
| 2019/0098329 A1 | 3/2019 | Han et al. |
| 2019/0116374 A1 | 4/2019 | Zhang et al. |
| 2019/0116381 A1 | 4/2019 | Lee et al. |
| 2019/0141334 A1 | 5/2019 | Lim et al. |
| 2019/0158827 A1 | 5/2019 | Sim et al. |
| 2019/0158866 A1 | 5/2019 | Kim |
| 2019/0200040 A1 | 6/2019 | Lim et al. |
| 2019/0215529 A1 | 7/2019 | Laroche |
| 2019/0222848 A1 | 7/2019 | Chen et al. |
| 2019/0222865 A1 | 7/2019 | Zhang et al. |
| 2019/0230362 A1 | 7/2019 | Chen et al. |
| 2019/0230376 A1 | 7/2019 | Hu et al. |
| 2019/0297325 A1 | 9/2019 | Lim et al. |
| 2019/0297343 A1 | 9/2019 | Seo et al. |
| 2019/0320180 A1 | 10/2019 | Yu et al. |
| 2019/0356925 A1 | 11/2019 | Ye et al. |
| 2020/0014948 A1 | 1/2020 | Lai et al. |
| 2020/0021839 A1 | 1/2020 | Pham Van et al. |
| 2020/0021845 A1 | 1/2020 | Lin et al. |
| 2020/0029088 A1 | 1/2020 | Xu et al. |
| 2020/0036997 A1* | 1/2020 | Li .................. H04N 19/436 |
| 2020/0077106 A1 | 3/2020 | Jhu et al. |
| 2020/0077116 A1 | 3/2020 | Lee et al. |
| 2020/0099951 A1 | 3/2020 | Hung et al. |
| 2020/0112715 A1 | 4/2020 | Hung et al. |
| 2020/0112741 A1 | 4/2020 | Han et al. |
| 2020/0120334 A1 | 4/2020 | Xu et al. |
| 2020/0128238 A1 | 4/2020 | Lee et al. |
| 2020/0128266 A1 | 4/2020 | Xu et al. |
| 2020/0145690 A1 | 5/2020 | Li et al. |
| 2020/0169726 A1 | 5/2020 | Kim et al. |
| 2020/0169745 A1 | 5/2020 | Han et al. |
| 2020/0169748 A1 | 5/2020 | Chen et al. |
| 2020/0186793 A1 | 6/2020 | Racape et al. |
| 2020/0186820 A1 | 6/2020 | Park et al. |
| 2020/0195920 A1 | 6/2020 | Racape et al. |
| 2020/0195959 A1 | 6/2020 | Zhang et al. |
| 2020/0195960 A1 | 6/2020 | Zhang et al. |
| 2020/0204820 A1 | 6/2020 | Zhang et al. |
| 2020/0221108 A1 | 7/2020 | Xu et al. |
| 2020/0228825 A1 | 7/2020 | Lim et al. |
| 2020/0236353 A1 | 7/2020 | Zhang et al. |
| 2020/0244954 A1 | 7/2020 | Heo et al. |
| 2020/0267408 A1 | 8/2020 | Lee et al. |
| 2020/0275124 A1 | 8/2020 | Ko et al. |
| 2020/0280735 A1 | 9/2020 | Lim et al. |
| 2020/0288150 A1 | 9/2020 | Jun et al. |
| 2020/0288168 A1 | 9/2020 | Zhang et al. |
| 2020/0296414 A1 | 9/2020 | Park et al. |
| 2020/0322628 A1 | 10/2020 | Lee et al. |
| 2020/0336726 A1 | 10/2020 | Wang et al. |
| 2020/0366923 A1 | 11/2020 | Zhang et al. |
| 2020/0374542 A1 | 11/2020 | Zhang et al. |
| 2020/0374543 A1 | 11/2020 | Liu et al. |
| 2020/0374544 A1 | 11/2020 | Liu et al. |
| 2020/0382770 A1 | 12/2020 | Zhang et al. |
| 2020/0396446 A1 | 12/2020 | Zhang et al. |
| 2020/0396447 A1 | 12/2020 | Zhang et al. |
| 2020/0396462 A1 | 12/2020 | Zhang et al. |
| 2020/0396466 A1 | 12/2020 | Zhang et al. |
| 2020/0404254 A1 | 12/2020 | Zhao et al. |
| 2020/0404285 A1 | 12/2020 | Zhang et al. |
| 2020/0404316 A1 | 12/2020 | Zhang et al. |
| 2020/0404319 A1 | 12/2020 | Zhang et al. |
| 2020/0404320 A1 | 12/2020 | Zhang et al. |
| 2020/0413038 A1 | 12/2020 | Zhang et al. |
| 2020/0413044 A1 | 12/2020 | Zhang et al. |
| 2020/0413045 A1 | 12/2020 | Zhang et al. |
| 2021/0006787 A1 | 1/2021 | Zhang et al. |
| 2021/0006788 A1 | 1/2021 | Zhang et al. |
| 2021/0006790 A1 | 1/2021 | Zhang et al. |
| 2021/0006819 A1 | 1/2021 | Zhang et al. |
| 2021/0006823 A1 | 1/2021 | Zhang et al. |
| 2021/0014520 A1 | 1/2021 | Zhang et al. |
| 2021/0014525 A1 | 1/2021 | Zhang et al. |
| 2021/0029351 A1 | 1/2021 | Zhang et al. |
| 2021/0029352 A1 | 1/2021 | Zhang et al. |
| 2021/0029362 A1 | 1/2021 | Liu et al. |
| 2021/0029366 A1 | 1/2021 | Zhang et al. |
| 2021/0029372 A1 | 1/2021 | Zhang et al. |

(56) References Cited

U.S. PATENT DOCUMENTS

| | | |
|---|---|---|
| 2021/0029374 A1 | 1/2021 | Zhang et al. |
| 2021/0051324 A1 | 2/2021 | Zhang et al. |
| 2021/0051339 A1 | 2/2021 | Liu et al. |
| 2021/0067783 A1 | 3/2021 | Liu et al. |
| 2021/0076063 A1 | 3/2021 | Liu et al. |
| 2021/0092379 A1 | 3/2021 | Zhang et al. |
| 2021/0092436 A1 | 3/2021 | Zhang et al. |
| 2021/0105482 A1 | 4/2021 | Zhang et al. |
| 2021/0120234 A1 | 4/2021 | Zhang et al. |
| 2021/0185326 A1 | 6/2021 | Wang et al. |
| 2021/0203984 A1 | 7/2021 | Salehifar et al. |
| 2021/0235108 A1 | 7/2021 | Zhang et al. |
| 2021/0258569 A1 | 8/2021 | Chen et al. |
| 2021/0321089 A1 | 10/2021 | Lin et al. |
| 2021/0337216 A1 | 10/2021 | Zhang et al. |
| 2021/0344947 A1 | 11/2021 | Zhang et al. |
| 2021/0352312 A1 | 11/2021 | Zhang et al. |
| 2021/0360230 A1 | 11/2021 | Zhang et al. |
| 2021/0360278 A1 | 11/2021 | Zhang et al. |
| 2021/0377518 A1 | 12/2021 | Zhang et al. |
| 2021/0377545 A1 | 12/2021 | Zhang et al. |
| 2021/0400298 A1 | 12/2021 | Zhao et al. |
| 2022/0007047 A1 | 1/2022 | Zhang et al. |
| 2022/0094915 A1 | 3/2022 | Zhang et al. |
| 2022/0094967 A1 | 3/2022 | Zhang et al. |
| 2022/0417551 A1 | 12/2022 | Lim et al. |

FOREIGN PATENT DOCUMENTS

| | | |
|---|---|---|
| CN | 1925614 A | 3/2007 |
| CN | 101193302 A | 6/2008 |
| CN | 101933328 A | 12/2010 |
| CN | 102474619 A | 5/2012 |
| CN | 102860006 A | 1/2013 |
| CN | 102907098 A | 1/2013 |
| CN | 103004204 A | 3/2013 |
| CN | 103096071 A | 5/2013 |
| CN | 103096073 A | 5/2013 |
| CN | 103339938 A | 10/2013 |
| CN | 103370937 A | 10/2013 |
| CN | 103404143 A | 11/2013 |
| CN | 103444182 A | 12/2013 |
| CN | 103518374 A | 1/2014 |
| CN | 103535039 A | 1/2014 |
| CN | 103609123 A | 2/2014 |
| CN | 103828364 A | 5/2014 |
| CN | 103858428 A | 6/2014 |
| CN | 103891281 A | 6/2014 |
| CN | 103931192 A | 7/2014 |
| CN | 104041042 A | 9/2014 |
| CN | 104054350 A | 9/2014 |
| CN | 104079944 A | 10/2014 |
| CN | 104126302 A | 10/2014 |
| CN | 104247434 A | 12/2014 |
| CN | 104350749 A | 2/2015 |
| CN | 104365102 A | 2/2015 |
| CN | 104396248 A | 3/2015 |
| CN | 104539950 A | 4/2015 |
| CN | 104584549 A | 4/2015 |
| CN | 104662909 A | 5/2015 |
| CN | 104756499 A | 7/2015 |
| CN | 104915966 A | 9/2015 |
| CN | 105245900 | 1/2016 |
| CN | 105324996 A | 2/2016 |
| CN | 105556971 A | 5/2016 |
| CN | 105681807 A | 6/2016 |
| CN | 105917650 A | 8/2016 |
| CN | 106464864 A | 2/2017 |
| CN | 106471806 A | 3/2017 |
| CN | 106716997 A | 5/2017 |
| CN | 106797477 A | 5/2017 |
| CN | 106851046 A | 6/2017 |
| CN | 106851267 A | 6/2017 |
| CN | 106851269 A | 6/2017 |
| CN | 107071458 A | 8/2017 |
| CN | 107079162 A | 8/2017 |
| CN | 107087165 A | 8/2017 |
| CN | 107113424 A | 8/2017 |
| CN | 107113442 A | 8/2017 |
| CN | 107113446 A | 8/2017 |
| CN | 107197301 A | 9/2017 |
| CN | 107211156 A | 9/2017 |
| CN | 107295348 A | 10/2017 |
| CN | 107347159 A | 11/2017 |
| CN | 107493473 A | 12/2017 |
| CN | 107592529 A | 1/2018 |
| CN | 107690809 A | 2/2018 |
| CN | 107690810 A | 2/2018 |
| CN | 107710764 A | 2/2018 |
| CN | 107959853 A | 4/2018 |
| CN | 108134934 A | 6/2018 |
| CN | 108200437 A | 6/2018 |
| CN | 108235009 A | 6/2018 |
| CN | 108293127 A | 7/2018 |
| CN | 108353184 A | 7/2018 |
| CN | 109076218 A | 12/2018 |
| CN | 109089119 A | 12/2018 |
| CN | 110169073 A | 8/2019 |
| EP | 2532160 A1 | 12/2012 |
| EP | 2668784 A1 | 12/2013 |
| EP | 2741499 A1 | 6/2014 |
| EP | 2983365 A1 | 2/2016 |
| EP | 3791585 A1 | 3/2021 |
| EP | 3791588 A1 | 3/2021 |
| EP | 3794825 A1 | 3/2021 |
| GB | 201111867 | 8/2011 |
| GB | 2488815 A | 9/2012 |
| GB | 2492778 A | 1/2013 |
| GB | 2588006 A | 4/2021 |
| JP | 2013110766 A | 6/2013 |
| JP | 2013537772 A | 10/2013 |
| JP | 2014501091 A | 1/2014 |
| JP | 2014509480 A | 4/2014 |
| JP | 2014197883 A | 10/2014 |
| JP | 2016059066 A | 4/2016 |
| JP | 2017123542 A | 7/2017 |
| JP | 2017028712 A | 1/2019 |
| JP | 2020523853 A | 8/2020 |
| JP | 2021052373 A | 4/2021 |
| JP | 2021510265 A | 4/2021 |
| JP | 2021513795 A | 5/2021 |
| JP | 2022504073 A | 1/2022 |
| JP | 2022507682 A | 1/2022 |
| JP | 2022507683 A | 1/2022 |
| KR | 20170058871 A | 5/2017 |
| KR | 20170115969 A | 10/2017 |
| RU | 2550554 C2 | 5/2015 |
| RU | 2571572 C2 | 12/2015 |
| RU | 2632158 C2 | 10/2017 |
| RU | 2669005 C2 | 10/2018 |
| TW | 201444349 A | 11/2014 |
| WO | 2011095259 A1 | 5/2011 |
| WO | 2011095260 A1 | 8/2011 |
| WO | 201207434 A2 | 6/2012 |
| WO | 2012074344 A2 | 6/2012 |
| WO | 2012095467 A1 | 7/2012 |
| WO | 2012172668 A1 | 12/2012 |
| WO | 2013081365 A1 | 6/2013 |
| WO | 2013157251 A1 | 10/2013 |
| WO | 2014007058 A1 | 1/2014 |
| WO | 2014054267 A1 | 4/2014 |
| WO | 2015006920 A1 | 1/2015 |
| WO | 2015042432 A1 | 3/2015 |
| WO | 2015052273 A1 | 4/2015 |
| WO | 2015100726 A1 | 7/2015 |
| WO | 2015180014 A1 | 12/2015 |
| WO | 2016008409 A1 | 1/2016 |
| WO | 2016054979 A1 | 4/2016 |
| WO | 2016091161 A1 | 6/2016 |
| WO | 2017043734 A1 | 3/2017 |
| WO | 2017058633 A1 | 4/2017 |
| WO | 2017197126 A1 | 11/2017 |
| WO | 2018012886 A1 | 1/2018 |
| WO | 2018045944 A1 | 3/2018 |

(56) References Cited

FOREIGN PATENT DOCUMENTS

| WO | 2018048904 A1 | 3/2018 |
|---|---|---|
| WO | 2018058526 A1 | 4/2018 |
| WO | 2018061522 A1 | 4/2018 |
| WO | 2018065397 A2 | 4/2018 |
| WO | 2018070107 A1 | 4/2018 |
| WO | 2018127119 A1 | 7/2018 |
| WO | 2018231700 A1 | 12/2018 |
| WO | 2018237299 A1 | 12/2018 |
| WO | 2019223746 A1 | 11/2019 |
| WO | 2020003275 A1 | 1/2020 |
| WO | 2020113051 A2 | 6/2020 |

OTHER PUBLICATIONS

Chien et al."CE4-Related: Modification on History-Based Mode Vector Prediction," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0401, 2018.

"History, based" Library USPTO Search Query, Mar. 3, 2022.

Examination Report from Patent Application GB2020091.1 dated Mar. 21, 2022.

Extended European Search Report from European Patent Application No. 20737921.5 dated Feb. 22, 2022 (9 pages).

Notice of Allowance from U.S. Appl. No. 17/019,675 dated Mar. 11, 2022.

Sullivan et al. "Meeting Report of the 11th Meeting of the Joint Video Experts Team (JVET),Ljubljana, SI, Jul. 10-18, 2018," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K1000, 2018.

Xin, Yakun, "Exploration and Optimization of Merge Mode Candidate Decision in HEVC," 2016 Microcomputers and Applications No. 15 Xin Yakun (School of Information Engineering, Shanghai Maritime University, Shanghai Jun. 2013) Sep. 1, 2016.

"VVC and Inter" Library USPTO Search Query, Mar. 7, 2022.

Examination Report from Patent Application GB2018263.0 dated Mar. 30, 2022.

Examination Report from Patent Application GB2019557.4 dated Apr. 1, 2022.

Final Office Action from U.S. Appl. No. 17/480,184 dated May 2, 2022.

Notice of Allowance from U.S. Appl. No. 17/019,675 dated Jun. 16, 2022.

Bandyopadhyay, Saurav, "Cross-Check of JVET-M0436:AHG2: Regarding HMVO Table Size," Joint Video Experts Team (JVET) of ITU-T SG 16 WP 3 and ISO/IEC JTC 1/SC 29/WG 11, 13th Meeting: Marrakech, MA Jan. 9-18, 2019, document JVET-M0562, Jan. 2019.

Bordes et al. "Description of SDR, HDR and 360° video coding technology proposal by Qualcomm and Technicolor—medium complexity version", JVET Meeting, JVET-J0022 (Apr. 2018).

Bross et al. "Versatile Video Coding (Draft 2)", JVET 11th Meeting, JVET-K1001-v5 (Jul. 2018).

Chen et al. "Description of SDR, HDR and 360° video coding technology proposal by Qualcomm and Technicolor—low and high complexity versions", Joint Video Exploration Team (JVET) of ITU-T SG 16 WP 3 and ISO/IEC JTC 1/SC 29/WG 11 10th Meeting: San Diego, US, JVET-J0021 (Apr. 2018).

Chen et al. "CE4.3.1: Shared merging candidate list", JVET 13th Meeting, JVET-M0170-v1 (Jan. 2019).

Chen et al. "Symmetrical mode for bi-prediction" JVET Meeting,JVET-J0063 (Apr. 2018).

Chen et al. "Internet Video Coding Test Model" (ITM) v 2.0 "Information Technology—Coding of audio-visual objects—Internet Video Coding", Geneva; XP030019221 (May 2012).

Chen et al. "Algorithm description of Joint Exploration Test Model 7 (JEM7)," JVET-G1001, (Jul. 2017).

Chien et al. "Enhanced AMVP Mechanism Based Adaptive Motion Search Range Decision Algorithm for Fast HEVC Coding," IEEE, Institute of Computer and Communication Engineering, 2014, pp. 3696-3699.

Esenlik et al. "Description of Core Experiment 9 (CE9): Decoder Side Motion Vector Derivation" JVET-J1029-r4, (Apr. 2018).

Han et al. "A dynamic motion vector referencing scheme for video coding" IEEE International Conference On Image Processing (ICIP), (Sep. 2016).

Information Technology—High efficiency coding and media delivery in heterogeneous environments—Part 2: "High Efficiency Video Coding" ISO/IEC JTC 1/SC 29/WG 11 N 17661, ISO/IEC DIS 23008-2_201x(4th Ed.) (Apr. 2018).

ITU-T H.265 "High efficiency video coding" Series H: Audiovisual and Multimedia Systems Infrastructure of audiovisual services—Coding of moving video,Telecommunication Standardization Sector of ITU, Available at address: https://www.itu.int/rec/T-REC-H.265 (Nov. 2019).

Kudo et al. "Motion Vector Prediction Methods Considering Prediction Continuity in HEVC," Picture Coding Symposium (PCS), 2016.

Lee et al. "Non-CE4:HMVP Unification between the Merge and MVP List," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0373, Mar. 2019.

Li et al. JVET-D0117r1 "Multi-Type-Tree" Joint Video Exploration Team (JVET) of ITU-T SG 16 WP 3 and ISO/IEC JTC 1/SC 29/WG 11, 4th Meeting: Chengdu, CN, Oct. 15-21, 2016.

Lin et al. "CE3: Summary report on motion prediction for texture coding" JCT-3V Meeting, JCT3V-G0023 (Jan. 2014).

Luthra et al., "Overview of the H.264/AVC video coding standard", Proceedings of SPIE vol. 5203 Applications of Digital Image Processing XXVI., 2003.

Ma et al. "Eleventh Five-Year Plan" teaching materials for ordinary colleges and universities, Principle and Application of S7-200 PLC and Digital Speed Control Systems, Jul. 31, 2009.

Park et al. "Hardware-friendly Advanced Motion Vector Predictor Generation for an HEVC Encoder," Journal of Semiconductor Technology and Science, Dec. 2018, 18(6):737-747.

Rapaka et al. "On intra block copy merge vector handling" JCT-VC Meeting, JCTVC-V0049 (Oct. 2015).

Robert et al. "High precision FRUC with additional candidates" JVET Meeting JVET-D0046 (Oct. 2016).

Sjoberg et al. "Description of SDR and HDR video coding technology proposal by Ericsson and Nokia" JVET Meeting, JVET-J0012-v1 (Apr. 2018).

Solovyev et al. "CE-4.6: Simplification for Merge List Derivation in Triangular Prediction Mode," Joint Video Experts Team (JVET) of ITU-T SG 16 WP 3 and ISO/IEC JTC 1/SC 29/WG 11, 14th Meeting: Geneva, CH, Mar. 19-27, 2019, document JVET-N0454, Mar. 2019.

Sprljan et al. "TE3 subtest 3: Local intensity compensation (LIC) for inter prediction", JCT-VC of ITU-T SG16 WP3 and ISO/IEC JTC1/SC29/WG11, 3rd Meeting: Guangzhou, CN, JCTVC-C233 (Oct. 2010).

Sullivan et al., "Overview of the High Efficiency Video Coding (HEVC) Standard", IEEE Transactions on Circuits and Systems for Video Technology, vol. 22, No. 12, Dec. 2012.

Toma et al. "Description of SDR video coding technology proposal by Panasonic", Joint Video Experts Team (JVET) of ITU-T SG 16 WP 3 and ISO/IEC JTC 1/SC 29/WG 11 10th Meeting: San Diego, US, JVET-J0020-v1 (Apr. 2018).

"Versatile Video Coding (VVC)", JVET, JEM-7.0, Available at address: https://jvet.hhi.fraunhofer.de/svn/svn_HMJEMSoftware/tags/ HM-16.6-JEM-7.0. Accessed on Feb. 11, 2020.

Wang et al. "Spec text for the agreed starting point on slicing and tiling", JVET 12th Meeting, JVET-L0686-v2 (Oct. 2018).

Xu et al. "Intra block copy improvement on top of Tencent's CfP response" JVET Meeting, JVET-J0050-r2 (Apr. 2018).

Yang et al. "Description of Core Experiment 4 (CE4): Inter prediction and motion vector coding" JVET-K1024 (Jul. 2018).

Yang et al. Description of Core Experiment 4 (CE4); Interprediction and Motion Vector Coding,JVET Meeting, The Joint Video Explo-

(56) References Cited

OTHER PUBLICATIONS ration Team of ISO/IEC JTC1/SC29/WG11 and ITU-TSG.16 No Meeting San Diego, Apr. 20, 2018, Document JVET-J1024, Apr. 20, 2018.

Yu et al. "Parallel AMVP Candidate List Construction for HEVC," Conference: Visual Communications and Image Processing (VCIP), Nov. 2012, IEEE, retrieved May 12, 2016.

Zhang et al. "CE2-related: Early awareness of accessing temporal blocks in sub-block merge list construction", JVET-M0273 (Jan. 2019).

Zhang et al. "CE4: History-based Motion Vector Prediction(Test 4.4.7)", Joint Video Experts Team (JVET) of ITU-T SG 16 WP 3 and ISO/IEC JTC 1/SC 29/WG 11, 12th meeting: Macao, CN, Oct. 3-12, 2018, Document JVET-L0266-v1and v2, Oct. 12, 2018.

Zhang et al. "CE4-related: History-based Motion Vector Prediction", Joint Video Experts Team (JVET) of ITU-T SG 16 WP 3 and ISO/IEC JTC 1/SC 29/WG 11, Document JVET-K0104-v5, Meeting Report of the 11th meeting of the Joint Video Experts Team (JVET), Ljubljana, SI, Jul. 10-18, 2018.

Zhang et al. "CE4-related: Restrictions on History-based Motion Vector Prediction", JVET-M0272 (Jan. 2019).

Zhang et al., "History-Based Motion Vector Prediction in Versatile Video Coding", 2019 Data Compression Conference (DCC), IEEE, pp. 43-52, XP033548557 (Mar. 2019).

Zhang et al. "CE4-4.4: Merge List Construction for Triangular Prediction Mode," Joint Video Experts Team (JVET) of ITU-T SG 16 WP 3 and ISO/IEC JTC 1/SC 29/WG 11, 14th Meeting: Geneva, CH, Mar. 19-27, 2019, document JVET-N0269, Mar. 2019.

Zhang et al. "CE10-related: Merge List Construction Process for Triangular Protection Mode," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0271, Jan. 2019.

Zhu et al. "Simplified HMVP," Joint Video Experts Team (JVET) of ITU-T SG 16 WP 3 and ISO/IEC JTC 1/SC 29/WG 11, 13th Meeting: Marrakech, MA, Jan. 9-18, 2019, Document JVET-M0473, Jan. 2019.

International Search Report and Written Opinion from International Patent Application No. PCT/IB2019/055549 dated Aug. 20, 2019 (16 pages).

International Search Report and Written Opinion from International Patent Application No. PCT/IB2019/055575 dated Aug. 20, 2019 (12 pages).

International Search Report and Written Opinion from International Patent Application No. PCT/IB2019/055576 dated Sep. 16, 2019 (15 pages).

International Search Report and Written Opinion from International Patent Application No. PCT/IB2019/055582 dated Sep. 20, 2019 (18 pages).

International Search Report and Written Opinion from International Patent Application No. PCT/CN2020/071332 dated Apr. 9, 2020(9 pages).

International Search Report and Written Opinion from International Patent Application No. PCT/CN2020/071656 dated Apr. 3, 2020(12 pages).

International Search Report and Written Opinion from International Patent Application No. PCT/CN2020/072387 dated Apr. 20, 2020(10 pages).

International Search Report and Written Opinion from International Patent Application No. PCT/CN2020/072391 dated Mar. 6, 2020 (11 pages).

International Search Report and Written Opinion from International Patent Application No. PCT/IB2019/055554 dated Aug. 20, 2019 (16 pages).

Rosewarne et al. "High Efficiency Video Coding (HEVC) Test Model 16 (HM 16) Improved Encoder Description Update 9," Joint Collaborative Team on Video Coding (JCT-VC) of ITU SG 16 WP3 and ISO/IEC JTC1/SC 29/WG 11 28th Meeting, Torino, IT, Jul. 15-21, 2017, document JCTVC-AB1002, 2017.

Non-Final Office Action from U.S. Appl. No. 17/019,675 dated Nov. 18, 2021.

Notice of Allowance from U.S. Appl. No. 17/019,753 dated Dec. 1, 2021.

Non-Final Office Action from U.S. Appl. No. 17/480,184 dated Dec. 29, 2021.

International Search Report and Written Opinion from International Patent Application No. PCT/IB2019/055556 dated Aug. 29, 2019 (15 pages).

International Search Report and Written Opinion from International Patent Application No. PCT/IB2019/055581 dated Aug. 29, 2019 (25 pages).

International Search Report and Written Opinion from International Patent Application No. PCT/IB2019/055586 dated Sep. 16, 2019 (16 pages).

International Search Report and Written Opinion from International Patent Application No. PCT/IB2019/055587 dated Sep. 16, 2019 (23 pages).

International Search Report and Written Opinion from International Patent Application No. PCT/IB2019/055588 dated Sep. 16, 2019 (21 pages).

International Search Report and Written Opinion from International Patent Application No. PCT/IB2019/055591 dated Jan. 10, 2019 (16 pages).

International Search Report and Written Opinion from International Patent Application No. PCT/IB2019/055593 dated Sep. 16, 2019 (23 pages).

International Search Report and Written Opinion from International Patent Application No. PCT/IB2019/055595 dated Sep. 16, 2019 (25 pages).

International Search Report and Written Opinion from International Patent Application No. PCT/IB2019/055619 dated Sep. 16, 2019 (26 pages).

International Search Report and Written Opinion from International Patent Application No. PCT/IB2019/055620 dated Sep. 25, 2019 (18 pages).

International Search Report and Written Opinion from International Patent Application No. PCT/IB2019/055621 dated Sep. 30, 2019 (18 pages).

International Search Report and Written Opinion from International Patent Application No. PCT/IB2019/055622 dated Sep. 16, 2019 (13 pages).

International Search Report and Written Opinion from International Patent Application No. PCT/IB2019/055623 dated Sep. 26, 2019 (17 pages).

International Search Report and Written Opinion from International Patent Application No. PCT/IB2019/055624 dated Sep. 26, 2019 (17 pages).

International Search Report and Written Opinion from International Patent Application No. PCT/IB2019/055625 dated Sep. 26, 2019 (19 pages).

International Search Report and Written Opinion from International Patent Application No. PCT/IB2019/055626 dated Sep. 16, 2019 (17 pages).

International Search Report and Written Opinion from International Patent Application No. PCT/IB2019/057690 dated Dec. 16, 2019 (17 pages).

International Search Report and Written Opinion from International Patent Application No. PCT/IB2019/057692 dated Jan. 7, 2020 (16 pages).

International Search Report and Written Opinion from International Patent Application No. PCT/IB2019/055571 dated Sep. 16, 2019 (20 pages).

International Search Report and Written Opinion from International Patent Application No. PCT/CN2020/080597 dated Jun. 30, 2020(11 pages).

Non-Final Office Action from U.S. Appl. No. 16/803,706 dated Apr. 17, 2020.

Non-Final Office Action from U.S. Appl. No. 16/796,693 dated Apr. 28, 2020.

Non-Final Office Action from U.S. Appl. No. 16/796,708 dated May 29, 2020.

(56) References Cited

OTHER PUBLICATIONS

Non-Final Office Action from U.S. Appl. No. 16/993,598 dated Oct. 14, 2020.
Final Office Action from U.S. Appl. No. 16/796,693 dated Oct. 27, 2020.
Non-Final Office Action from U.S. Appl. No. 17/019,675 dated Nov. 10, 2020.
Guionnet et al. "CE5.h: Reducing the Coding Cost of Merge Index by Dynamic Merge Index Reallocation," Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, document JCT3V-B0078, 2012.
Lee et al. "EE2.6: Modification of Merge Candidate Derivation: ATMVP Simplification and Merge Pruning," Joint Video Exploration Team (JVET) of ITU-T SG 16 WP 3 and ISO/IEC JTC 1/SC 29/WG 11, 3rd Meeting: Geneva, CH, May 26-Jun. 2016, document JVET-C0035, 2016.
Toma et al. "Description of SDR video coding technology proposal by Panasonic", Joint Video Experts Team (JVET) of ITU-T SG 16 WP 3 and ISO/IEC JTC 1/SC 29/WG 11 10th Meeting: San Diego, US, JVET-J0020-v1and v2 (Apr. 2018).
Non-Final Office Action from U.S. Appl. No. 17/005,634 dated Nov. 13, 2020.
Non-Final Office Action from U.S. Appl. No. 17/019,753 dated Nov. 17, 2020.
Non-Final Office Action from U.S. Appl. No. 17/031,322 dated Nov. 17, 2020.
Non-Final Office Action from U.S. Appl. No. 17/011,068 dated Nov. 19, 2020.
Non-Final Office Action from U.S. Appl. No. 16/998,296 dated Nov. 24, 2020.
Non-Final Office Action from U.S. Appl. No. 16/998,258 dated Nov. 25, 2020.
Non-Final Office Action from U.S. Appl. No. 17/005,702 dated Nov. 27, 2020.
Non-Final Office Action from U.S. Appl. No. 17/005,574 dated Dec. 1, 2020.
Non-Final Office Action from U.S. Appl. No. 17/011,058 dated Dec. 15, 2020.
Non-Final Office Action from U.S. Appl. No. 17/071,139 dated Dec. 15, 2020.
Non-Final Office Action from U.S. Appl. No. 16/993,561 dated Dec. 24, 2020.
Non-Final Office Action from U.S. Appl. No. 17/031,404 dated Dec. 24, 2020.
Non-Final Office Action from U.S. Appl. No. 17/071,084 dated Dec. 10, 2020.
Notice of Allowance from U.S. Appl. No. 16/796,693 dated Feb. 10, 2021.
Notice of Allowance from U.S. Appl. No. 17/018,200 dated Mar. 1, 2021.
Final Office Action from U.S. Appl. No. 17/019,753 dated Mar. 8, 2021.
Final Office Action from U.S. Appl. No. 17/019,675 dated Mar. 19, 2021.
Notice of Allowance from U.S. Appl. No. 16/998,296 dated Mar. 23, 2021.
Notice of Allowance from U.S. Appl. No. 16/998,258 dated Mar. 24, 2021.
Non-Final Office Action from U.S. Appl. No. 17/011,058 dated Apr. 13, 2021.
Final Office Action from U.S. Appl. No. 17/071,139 dated Apr. 16, 2021.
Non-Final Office Action from U.S. Appl. No. 17/018,200 dated Nov. 20, 2020.
Notice of Allowance from U.S. Appl. No. 17/011,068 dated Mar. 1, 2021.
Non-Final Office Action from U.S. Appl. No. 17/229,019 dated Jun. 25, 2021.
Non-Final Office Action from U.S. Appl. No. 17/019,753 dated Jul. 22, 2021.
Non-Final Office Action from U.S. Appl. No. 16/796,708 dated Aug. 11, 2021.
Notice of Eligibility of Grant from Singapore Patent Application No. 11202011714R dated Jul. 25, 2022 (10 pages).
Notice of Allowance from U.S. Appl. No. 17/229,019 dated Oct. 12, 2022.
Non-Final Office Action from U.S. Appl. No. 16/796,708 dated Nov. 23, 2022.
Non-Final Office Action from U.S. Appl. No. 17/457,868 dated Nov. 25, 2022.
Non-Final Office Action from U.S. Appl. No. 17/135,054 dated Nov. 25, 2022.
Akula et al. "Description of SDR, HDR and 360° video coding technology proposal considering mobile application scenario by Samsung, Huawei, GoPro, and HiSilicon" Joint Video Exploration Team (JVET)of ITU-T SG 16 WP 3 and ISO/IEC JTC 1/SC 29/WG 1110th Meeting: San Diego, US, Apr. 10-20, 2018, document JVET-J0024, 2018. (cited in RU2020138539 OA1 mailed Dec. 5, 2022).
Non-Final Office Action from U.S. Appl. No. 17/369,132 dated Mar. 30, 2023.
Nevdyaev, Telecommunication Technologies, English-Russian Explanatory Dictionary and Reference Book, Communications and Business, Moscow, 2002, p. 44 & p. 431.
Jiang et al. "A Fast Candidate Selection Method for Merge Mode Based on Adaptive Threshold," Journal of Optoelectronics: Laser, Sep. 2016, 27(9):900-986.
Zhao et al. "CE4: Methods of Reducing Number of Pruning Checks of History Based Motion Vector Prediction (Test 4.1.1)," Joint Video Experts Team (JVET)of ITU-SG 16 WP 3 and ISO/IEC JTC 1/SC 29/WG 1113th Meeting: Marrakech, MA, Jan. 9-18, 2019, document JVET-M0124, 2019.
Non-Final Office Action from U.S. Appl. No. 17/374,160 dated Jul. 3, 2023.
Non-Final Office Action from U.S. Appl. No. 17/374,311 dated Aug. 7, 2023.
Office Action from Canadian Patent Application No. 3,101,730 dated Aug. 10, 2023 (4 pages).

\* cited by examiner

Fig. 3. Modes for splitting a CB into PBs, subject to certain size constraints. For intrapicture-predicted CBs, only $M \times M$ and $M/2 \times M/2$ are supported.

Prior Art

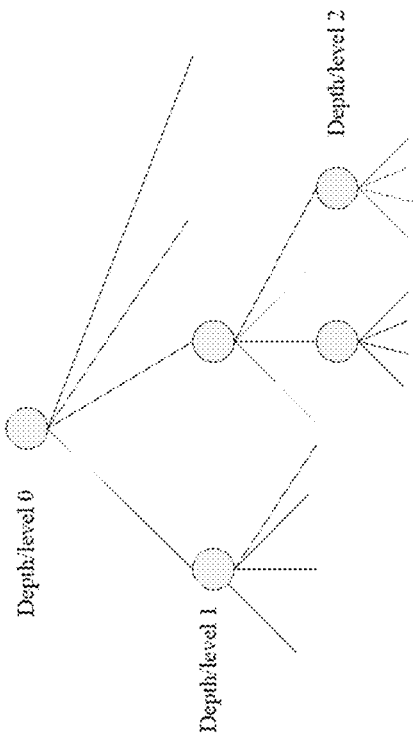
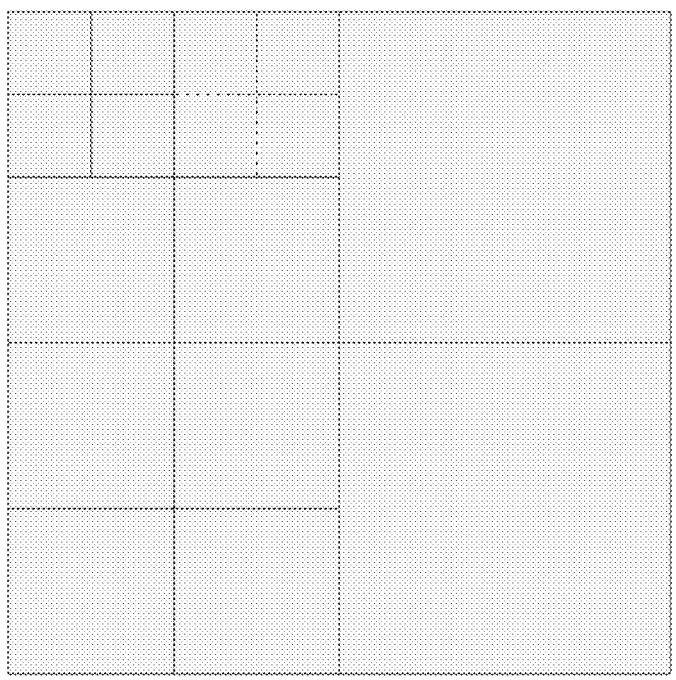
FIG. 4 Prior Art

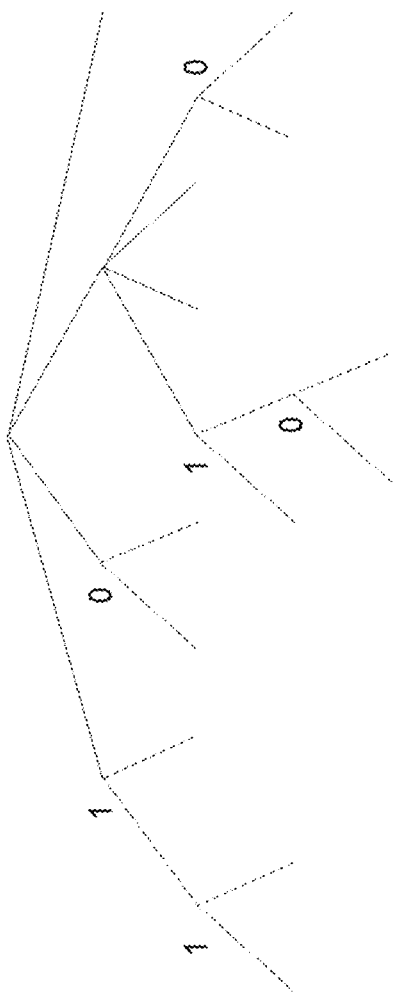
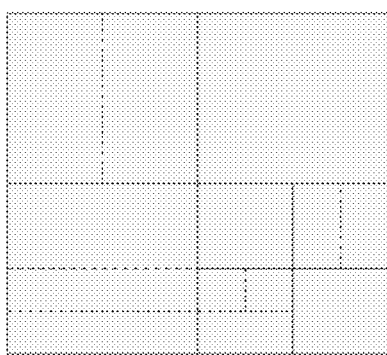
FIG. 5   Prior Art

Original Merge candidate list

| Merge_idx | L0 | L1 |
|---|---|---|
| 0 | mvL0_A,ref0 | - |
| 1 | - | mvL1_B,ref0 |
| 2 | | |
| 3 | | |
| 4 | | |

Merge candidate list after adding combined candidates

| Merge_idx | L0 | L1 |
|---|---|---|
| 0 | mvL0_A,ref0 | combine |
| 1 | | mvL1_B,ref0 |
| 2 | mvL0_A,ref0 | mvL1_B,ref0 |
| 3 | | |
| 4 | | |

FIG. 15

CONDITIONS FOR STARTING CHECKING HMVP CANDIDATES DEPEND ON TOTAL NUMBER MINUS K

CROSS REFERENCE TO RELATED APPLICATIONS

This application is a continuation of U.S. patent application Ser. No. 17/018,200, filed on Sep. 11, 2020 which is a continuation of International Application No. PCT/IB2019/057690 filed on Sep. 12, 2019 which claims the priority to and benefits of International Patent Application No. PCT/CN2018/105193, filed on Sep. 12, 2018. All the aforementioned patent applications are hereby incorporated by reference in their entireties.

TECHNICAL FIELD

This patent document relates to video coding and decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

This document discloses methods, systems, and devices for encoding and decoding digital video using a merge list of motion vectors.

In one example aspect, a candidate list construction process is disclosed. The method includes checking one or more video blocks in pre-defined relative positions compared to a first video block to derive a first set of candidates that are added to the candidate list, wherein each of the first set of candidates is derived from corresponding motion information of the video blocks, checking, after deriving the first set of candidates and upon a determination that a number of the first set of candidates has not reached a predetermined limit, one or multiple tables to derive a second set of candidates that are added to the candidate list and processing the first video block based on a bitstream representation of the first video block and the constructed candidate list.

In another example aspect, another method of candidate list construction is disclosed. The method includes checking one or more video blocks in pre-defined relative positions compared to a first video block to derive a first set of candidates, wherein each of the first set of candidates is derived from corresponding motion information of the video blocks, checking, after deriving the first set of candidates and upon a determination that a number of the first set of candidates has not reached a predetermined limit, one or multiple tables to derive a second set of candidates, each table including one or more history-based motion vector prediction (HMVP) candidates based on motion information of a previous block, constructing the candidate list by selectively adding available ones of the first and second sets of candidates to the candidate list and processing the first video block based on a bitstream representation of the first video block and the constructed candidate list.

In yet another example aspect, a video encoder device that implements a video encoding method described herein is disclosed.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

The details of one or more implementations are set forth in the accompanying attachments, the drawings, and the description below. Other features will be apparent from the description and drawings, and from the claims.

BRIEF DESCRIPTION OF THE DRAWINGS

FIG. 4 illustrates an example implementation for subdivision of a CTB into CBs and transform block (TBs). Solid lines indicate CB boundaries and dotted lines indicate TB boundaries, including an example CTB with its partitioning, and a corresponding quadtree.

FIG. 5 shows an example of a Quad Tree Binary Tree (QTBT) structure for partitioning video data.

FIG. 15 shows an example of a combined bi-predictive merge candidate.

DETAILED DESCRIPTION

Section headings are used in the present document for improving readability and do not limit the scope of techniques and embodiments described in each section only to that section. Furthermore, while certain terms from various existing video codec standards are used, the disclosed technologies are not limited only to these video standards or their successors and are applicable to other video codec standards. Furthermore, in some cases, techniques are disclosed using corresponding coding steps, and it will be understood that, at a decoder, the corresponding decoding steps in reverse order will be performed. In addition, coding may also be used to perform transcoding in which a video is represented from one coded representation (e.g., one bitrate) to another coded representation (e.g., a different bitrate).

To improve compression ratio of video, researchers are continually looking for new techniques by which to encode video and correspondingly decode coded representation of video.

1. Introduction

The present document is related to video coding technologies. Specifically, it is related to motion information coding (such as merge mode, AMVP mode, where AMVP stands for Advanced Motion Vector Prediction) in video coding. It may be applied to the existing video coding standard like HEVC, or the standard (Versatile Video Coding) to be finalized. It may be also applicable to future video coding standards or video codec.

2. Brief Discussion

Figure 1:
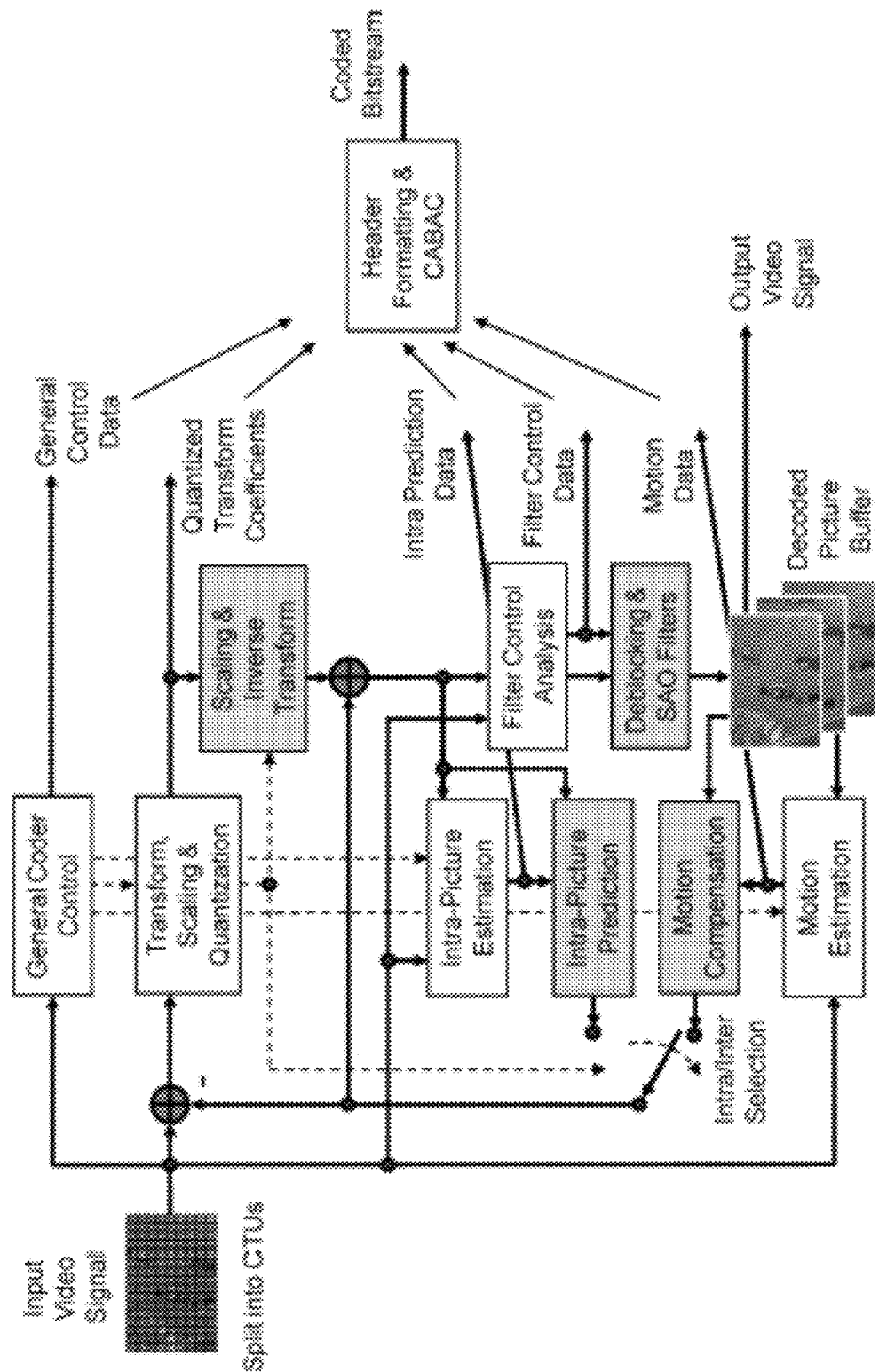
FIG. 1 is a block diagram showing an example of a video encoder implementation

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. An example of a typical HEVC encoder framework is depicted in FIG. 1.

2.1 Partition Structure 2.1.1 Partition tree structure in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 2:
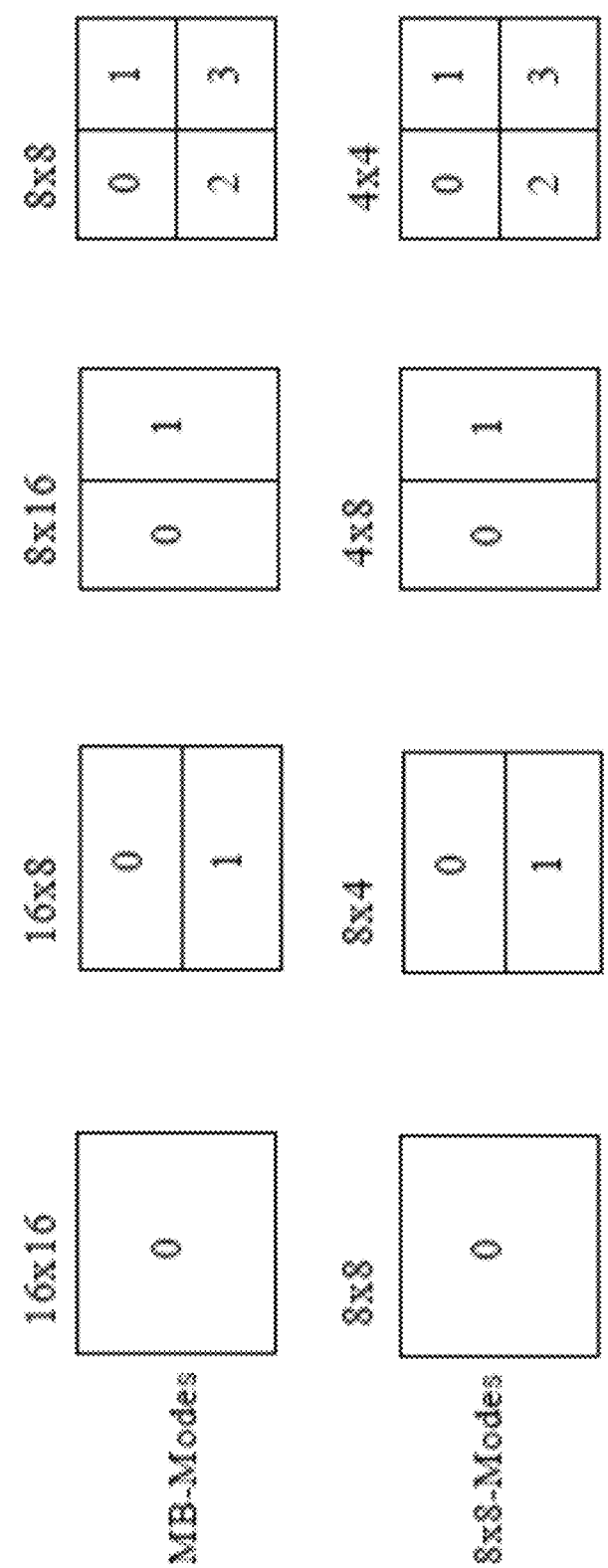
FIG. 2 illustrates macroblock partitioning in the H.264 video coding standard.

An inter-coded block uses temporal prediction, instead of spatial prediction, by estimating motion among pictures. Motion can be estimated independently for either 16×16 macroblock or any of its sub-macroblock partitions: 16×8, 8×16, 8×8, 8×4, 4×8, 4×4 (see FIG. 2). Only one motion vector (MV) per sub-macroblock partition is allowed.

2.1.2 Partition Tree Structure in HEVC

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

Figure 3:
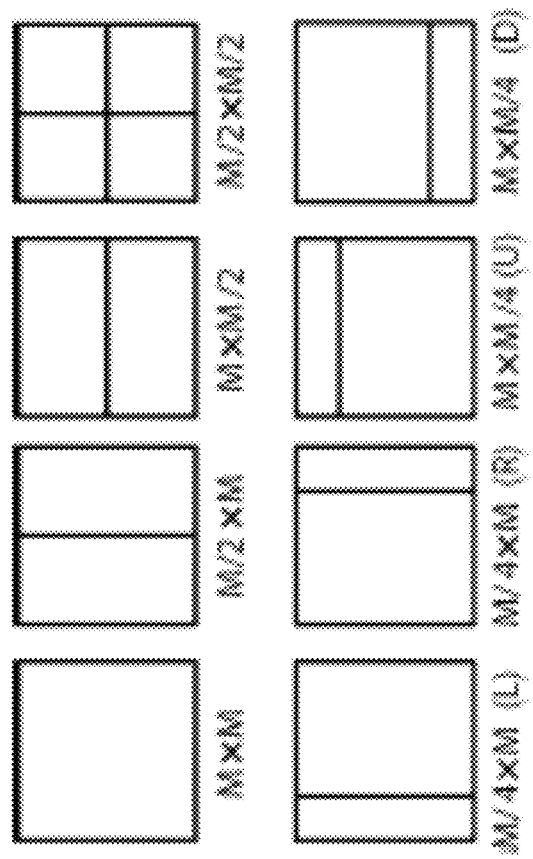
FIG. 3 illustrates an example of splitting coding blocks (CB) into prediction blocks (PU).

3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. FIG. 3 shows examples of allowed PBs for a M×M CU.

4) TUs and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

FIG. 4 shows an example of a subdivision of a CTB into CBs [and transform block (TBs)]. Solid lines indicate CB borders and dotted lines indicate TB borders. (a) CTB with its partitioning. (b) corresponding quadtree.

2.1.2.1 Tree-Structured Partitioning into Transform Blocks and Units

For residual coding, a CB can be recursively partitioned into transform blocks (TBs). The partitioning is signaled by a residual quadtree. Only square CB and TB partitioning is specified, where a block can be recursively split into quadrants, as illustrated in FIG. 4. For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants. The leaf node blocks resulting from the residual quadtree are the transform blocks that are further processed by transform coding. The encoder indicates the maximum and minimum luma TB sizes that it will use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intra-picture-predicted CUs, the decoded samples of the nearest-neighboring TBs (within or outside the CB) are used as reference data for intra picture prediction.

In contrast to previous standards, the HEVC design allows a TB to span across multiple PBs for inter-picture predicted CUs to maximize the potential coding efficiency benefits of the quadtree-structured TB partitioning.

2.1.2.2 Parent and Child Nodes

A CTB is divided according to a quad-tree structure, the nodes of which are coding units. The plurality of nodes in a quad-tree structure includes leaf nodes and non-leaf nodes. The leaf nodes have no child nodes in the tree structure (i.e., the leaf nodes are not further split). The, non-leaf nodes include a root node of the tree structure. The root node corresponds to an initial video block of the video data (e.g., a CTB). For each respective non-root node of the plurality of nodes, the respective non-root node corresponds to a video block that is a sub-block of a video block corresponding to a parent node in the tree structure of the respective non-root node. Each respective non-leaf node of the plurality of non-leaf nodes has one or more child nodes in the tree structure.

2.1.3 Quadtree Plus Binary Tree Block Structure with Larger CTUs in JEM

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

2.1.3.1 QTBT Block Partitioning Structure

Different from HEVC, the QTBT structure removes the concepts of multiple partition types, i.e. it removes the separation of the CU, PU and TU concepts, and supports more flexibility for CU partition shapes. In the QTBT block structure, a CU can have either a square or rectangular shape. As shown in FIG. 5, a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme.
  CTU size: the root node size of a quadtree, the same concept as in HEVC
  MinQTSize: the minimally allowed quadtree leaf node size
  MaxBTSize: the maximally allowed binary tree root node size
  MaxBTDepth: the maximally allowed binary tree depth
  MinBTSize: the minimally allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

FIG. 5 (left) illustrates an example of block partitioning by using QTBT, and FIG. 5 (right) illustrates the corresponding tree representation. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.1.4 Ternary-Tree for VVC

In some embodiments, tree types other than quad-tree and binary-tree are supported. In the implementation, two more ternary tree (TT) partitions, i.e., horizontal and vertical center-side ternary-trees are introduced, as shown in FIG. 6, drawings (d) and (e).

Figure 6:
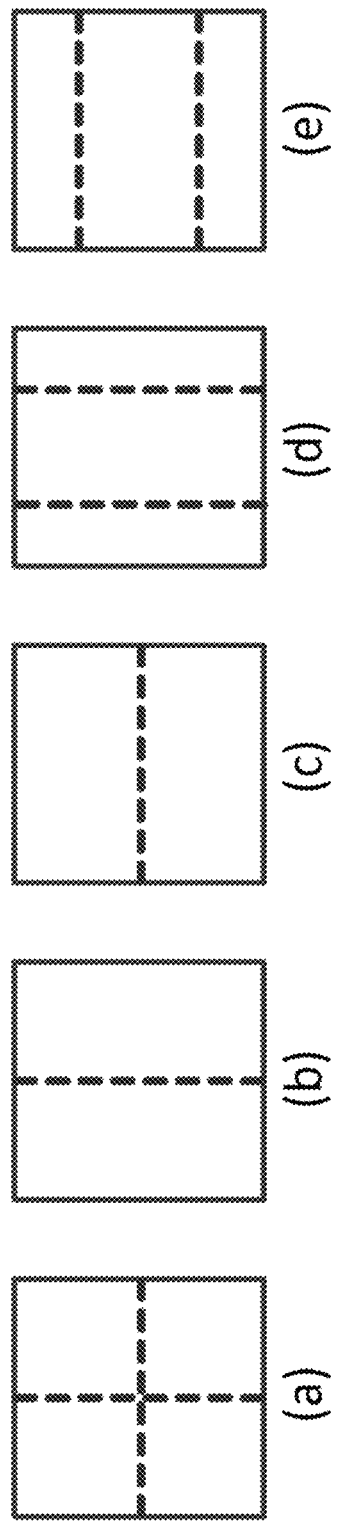
FIG. 6 shows an example of video block partitioning.

FIG. 6 shows: (a) quad-tree partitioning (b) vertical binary-tree partitioning (c) horizontal binary-tree partitioning (d) vertical center-side ternary-tree partitioning (e) horizontal center-side ternary-tree partitioning.

In some implementations, there are two levels of trees, region tree (quad-tree) and prediction tree (binary-tree or ternary-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

2.1.5 Example Partitioning Structure

The tree structure used in this response, called Multi-Tree Type (MTT), is a generalization of the QTBT. In QTBT, as shown in FIG. 5, a Coding Tree Unit (CTU) is firstly partitioned by a quad-tree structure. The quad-tree leaf nodes are further partitioned by a binary-tree structure.

The fundamental structure of MTT constitutes of two types of tree nodes: Region Tree (RT) and Prediction Tree (PT), supporting nine types of partitions, as shown in FIG. 7.

Figure 7:
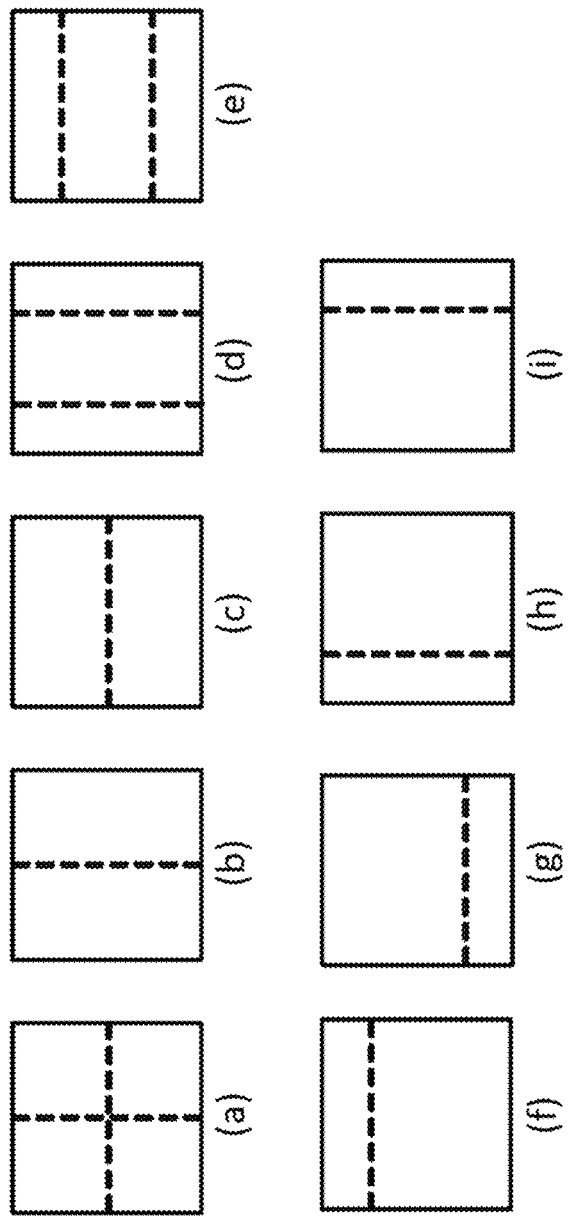
FIG. 7 shows an example of quad-tree partitioning.

FIG. 7 shows: (a) quad-tree partitioning (b) vertical binary-tree partitioning (c) horizontal binary-tree partitioning (d) vertical ternary-tree partitioning (e) horizontal ternary-tree partitioning (f) horizontal-up asymmetric binary-tree partitioning (g) horizontal-down asymmetric binary-tree partitioning (h) vertical-left asymmetric binary-tree partitioning (i) vertical-right asymmetric binary-tree partitioning.

Figure 8:
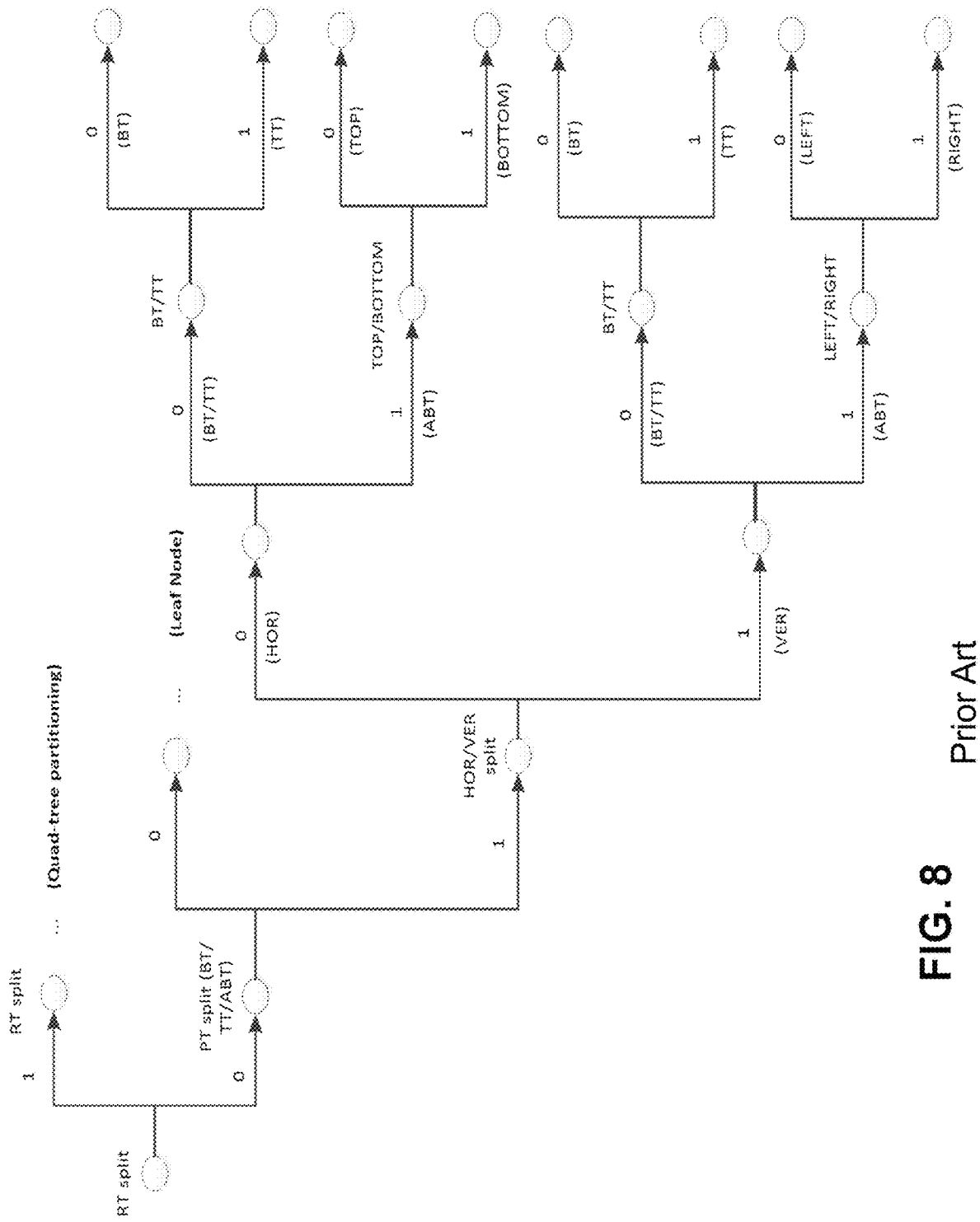
FIG. 8 shows an example of tree-type signaling.

A region tree can recursively split a CTU into square blocks down to a 4×4 size region tree leaf node. At each node in a region tree, a prediction tree can be formed from one of three tree types: Binary Tree (BT), Ternary Tree (TT), and Asymmetric Binary Tree (ABT). In a PT split, it is prohibited to have a quadtree partition in branches of the prediction tree. As in JEM, the luma tree and the chroma tree are separated in I slices. The signaling methods for RT and PT are illustrated in FIG. 8.

2.2 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors, such a coding mode is called AMVP mode.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signalled explicitly per each PU.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.2.1 Merge Mode

2.2.1.1 Derivation of Candidates for Merge Mode

Figure 9:
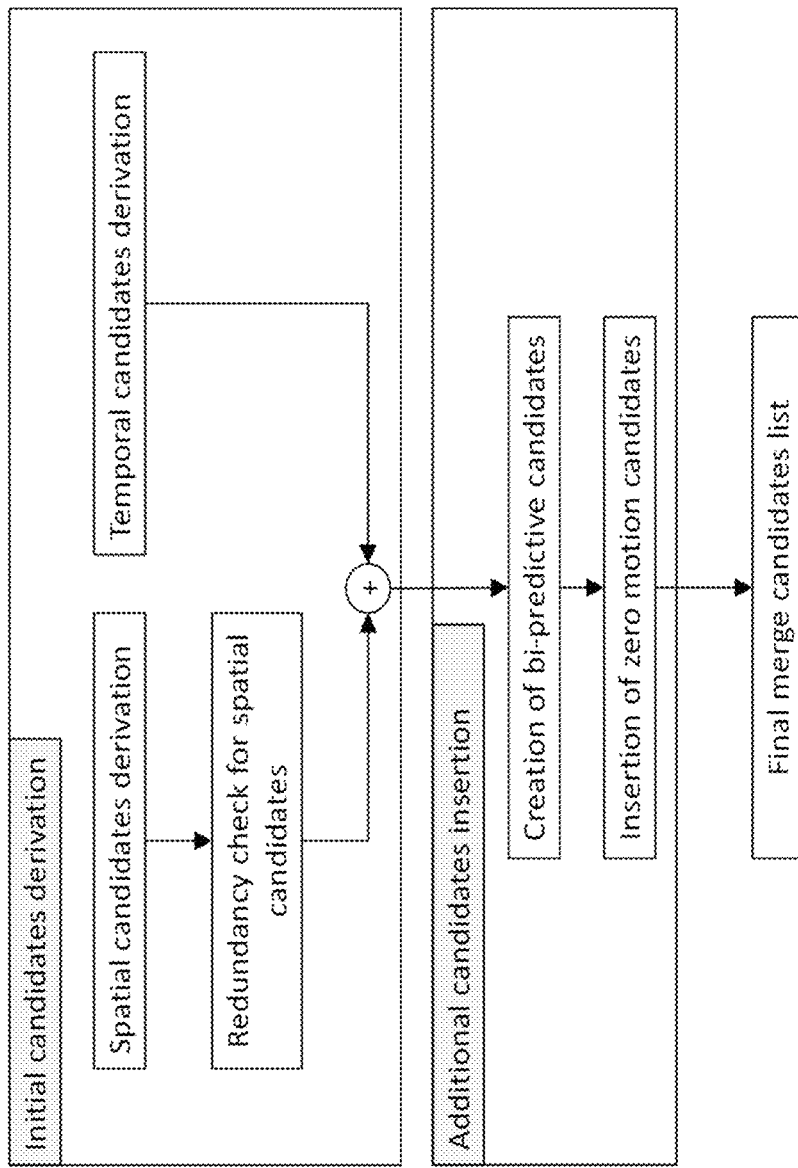
FIG. 9 shows an example of a derivation process for merge candidate list construction.

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates These steps are also schematically depicted in FIG. 9. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.2.1.2 Spatial Candidates Derivation

Figure 10:
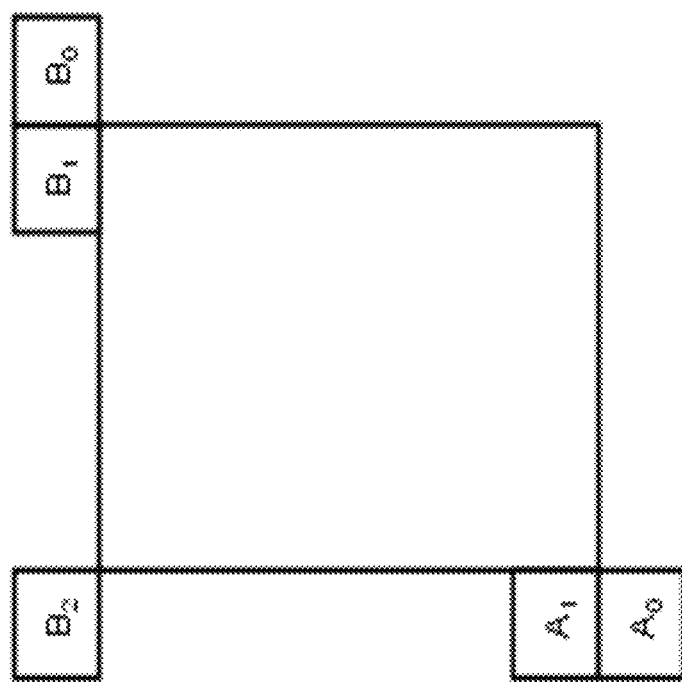
FIG. 10 shows example positions of spatial merge candidates.
Figure 11:
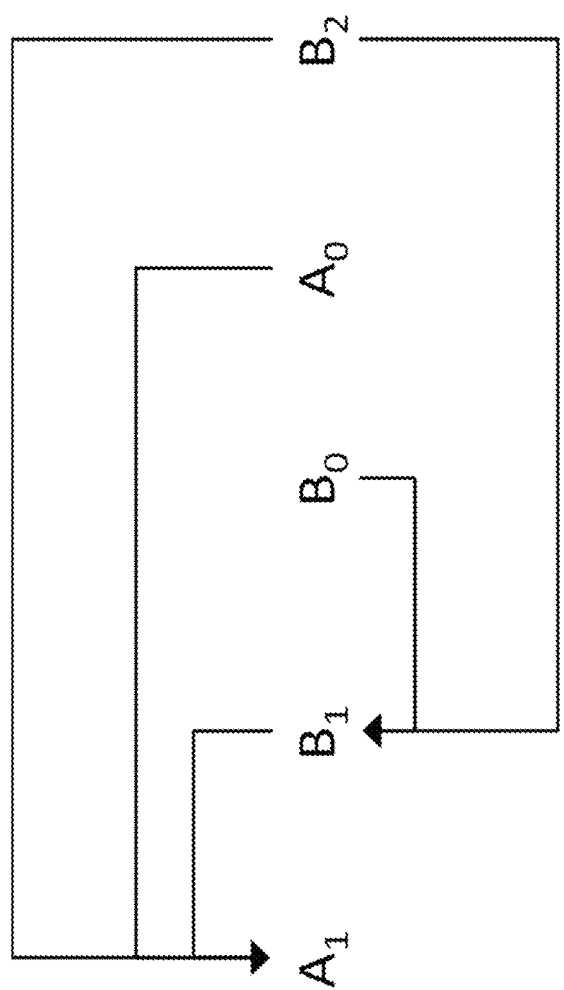
FIG. 11 shows examples of candidate pairs considered for redundancy check of spatial merge candidates.
Figure 12:
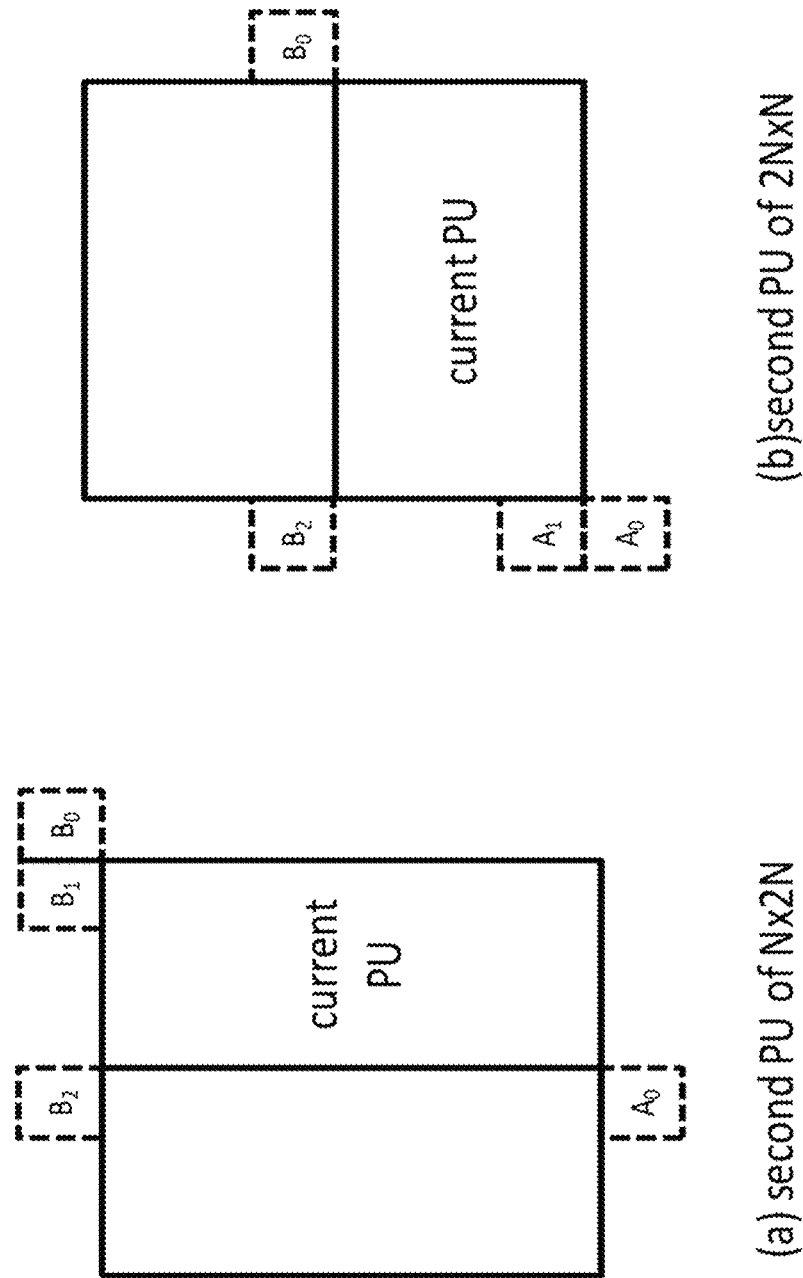
FIG. 12 shows examples of positions for the second PU of N×2N and 2N×N partitions.

In the derivation of spatial merge candidates, a maximum of four merge candidates are selected among candidates located in the positions depicted in FIG. 10. The order of derivation is $A_1, B_1, B_0, A_0$ and $B_2$. Position $B_2$ is considered only when any PU of position $A_1, B_1, B_0, A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 11 are considered and a candidate is only added to the list if the corresponding candidate used for redundancy check has not the same motion information. Another source of duplicate motion information is the "second PU" associated with partitions different from 2N×2N. As an example, FIG. 12 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.2.1.3 Temporal Candidate Derivation

Figure 13:
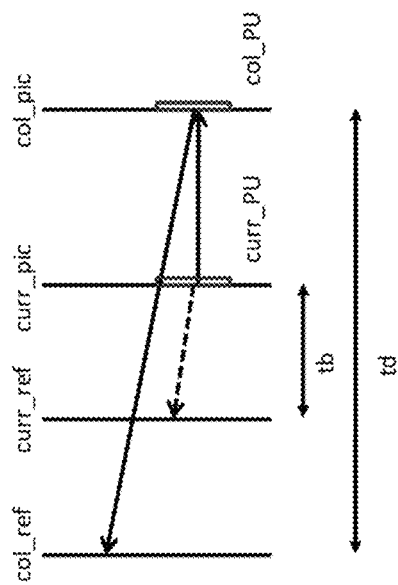
FIG. 13 illustrates motion vector scaling for temporal merge candidates.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dashed line in FIG. 13, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate. Illustration of motion vector scaling for temporal merge candidate.

Figure 14:
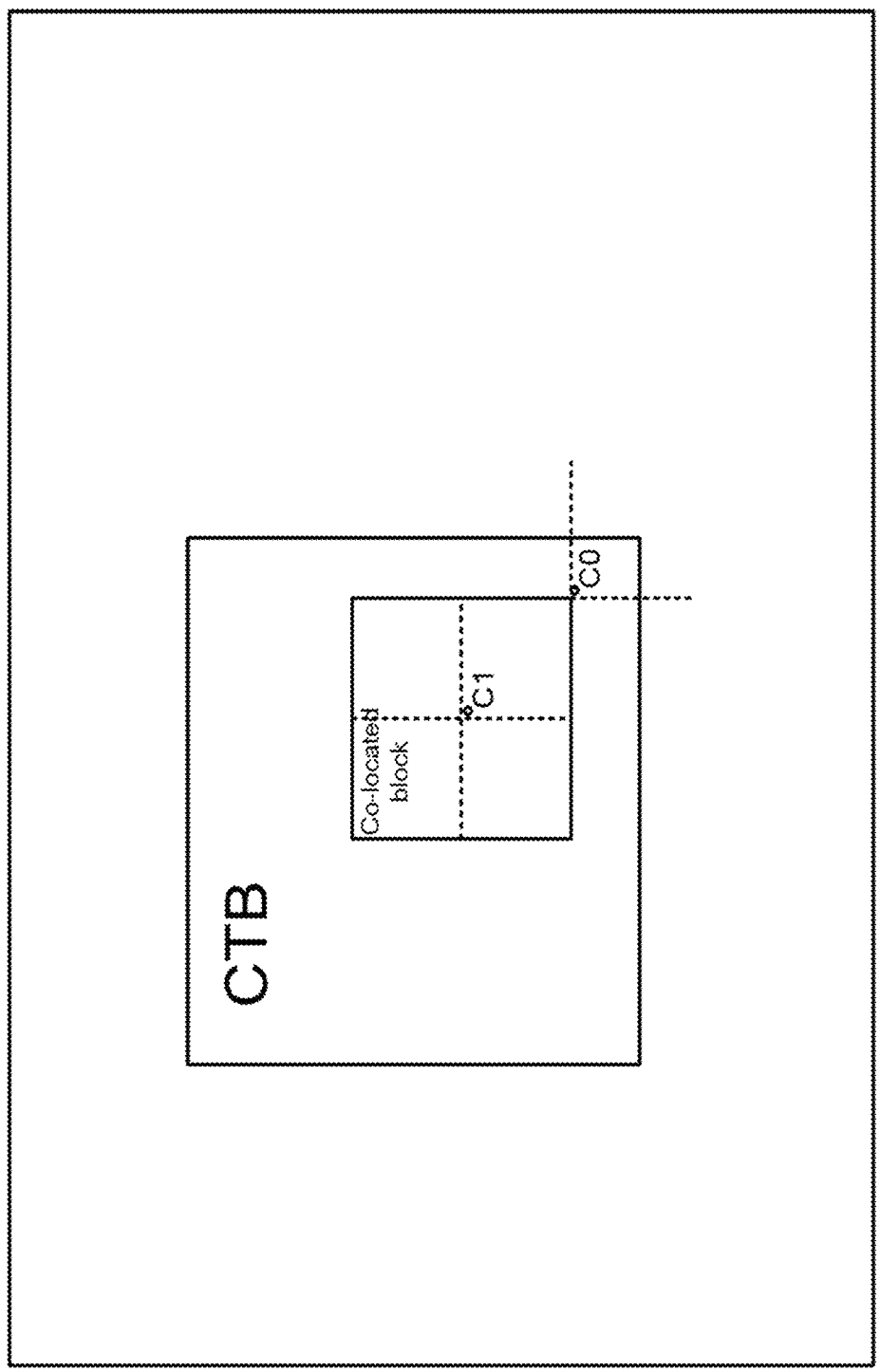
FIG. 14 shows candidate positions for temporal merge candidates, and their co-located picture.

In the co-located PU (Y) belonging to the reference frame, the position for the temporal candidate is selected between candidates $C_0$ and $C_1$, as depicted in FIG. 14. If PU at position $C_0$ is not available, is intra coded, or is outside of the current CTU, position $C_1$ is used. Otherwise, position $C_0$ is used in the derivation of the temporal merge candidate.

2.2.1.4 Additional Candidates Insertion

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 15 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.2.1.5 Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element. When a MER is defined, merge candidates falling in the same region are marked as unavailable and therefore not considered in the list construction.

7.3.2.3 Picture Parameter Set RBSP Syntax 7.3.2.3.1 General Picture Parameter Set RBSP Syntax

|  | Descriptor |
| --- | --- |
| pic_parameter_set_rbsp( ) { |  |
|   pps_pic_parameter_set_id | ue(v) |
|   pps_seq_parameter_set_id | ue(v) |
|   dependent_slice_segments_enabled_flag | u(1) |
|   ... |  |
|   pps_scaling_list_data_present_flag | u(1) |
|   if( pps_scaling_list_data_present_flag ) |  |
|     scaling_list_data( ) |  |
|   lists_modification_present_flag | u(1) |
|   log2_parallel_merge_level_minus2 | ue(v) |
|   slice_segment_header_extension_present_flag | u(1) |
|   pps_extension_present_flag | u(1) |
|   ... |  |
|   rbsp_trailing_bits( ) |  |
| } |  | log 2_parallel_merge_level_minus2 plus 2 specifies the value of the variable Log 2ParMrgLevel, which is used in the derivation process for luma motion vectors for merge mode as specified in clause 8.5.3.2.2 and the derivation process for spatial merging candidates as specified in clause 8.5.3.2.3. The value of log 2_parallel_merge_level_minus2 shall be in the range of 0 to Ctb Log 2SizeY−2, inclusive. The variable Log 2ParMrgLevel is derived as follows:

Log 2ParMrgLevel=log 2_parallel_merge_level_minus2+2   (7-37)

NOTE 3—The value of Log 2ParMrgLevel indicates the built-in capability of parallel derivation of the merging candidate lists. For example, when Log 2ParMrgLevel is equal to 6, the merging candidate lists for all the prediction units (PUs) and coding units (CUs) contained in a 64×64 block can be derived in parallel.

2.2.2 Motion Vector Prediction in AMVP Mode

Motion vector prediction exploits spatio-temporal correlation of motion vector with neighbouring PUs, which is used for explicit transmission of motion parameters. It constructs a motion vector candidate list by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (e.g., FIGS. 2 to 8). In the following sections, details about derivation process of motion vector prediction candidate are provided.

2.2.2.1 Derivation of Motion Vector Prediction Candidates

Figure 16:
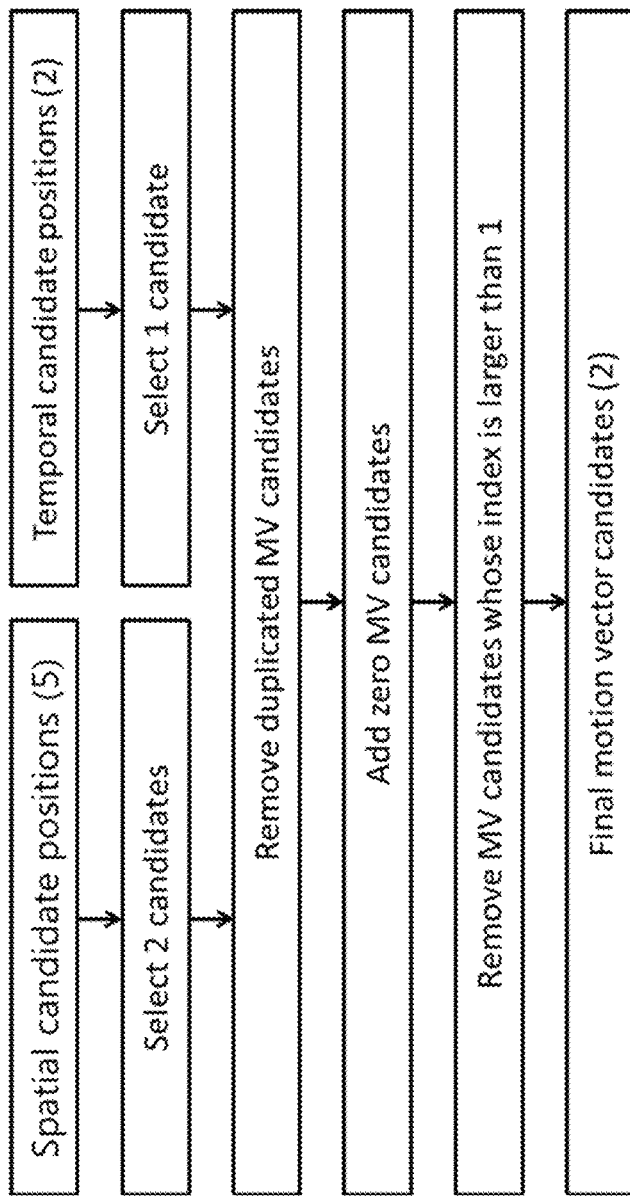
FIG. 16 shows an example of a derivation process for motion vector prediction candidates.

FIG. 16 summarizes derivation process for motion vector prediction candidate.

In advanced motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 11.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.2.2.2 Spatial Motion Vector Candidates

In the derivation of spatial motion vector candidates, a maximum of two candidates are considered among five potential candidates, which are derived from PUs located in positions as depicted in FIG. 11, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
 (1) Same reference picture list, and same reference picture index (same POC)
 (2) Different reference picture list, but same reference picture (same POC)

Spatial scaling
 (3) Same reference picture list, but different reference picture (different POC)
 (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 17:
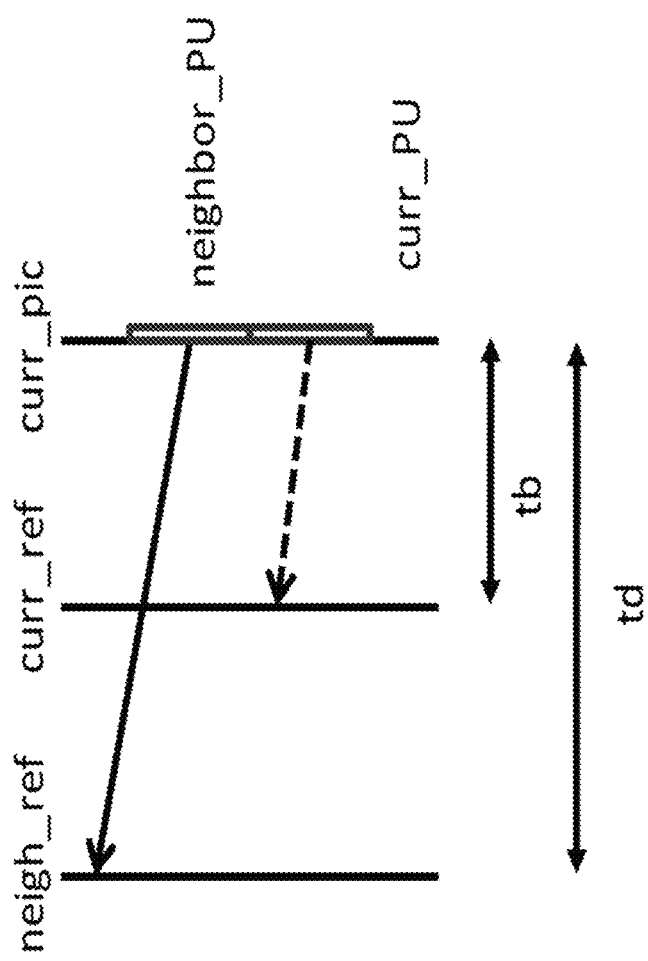
FIG. 17 shows an example of motion vector scaling for spatial motion vector candidates.

In a spatial scaling process, the motion vector of the neighbouring PU is scaled in a similar manner as for temporal scaling, as depicted as FIG. 17. The main difference is that the reference picture list and index of current PU is given as input; the actual scaling process is the same as that of temporal scaling.

2.2.2.3 Temporal Motion Vector Candidates

Apart for the reference picture index derivation, all processes for the derivation of temporal merge candidates are the same as for the derivation of spatial motion vector candidates (see, e.g., FIG. 6). The reference picture index is signalled to the decoder.

2.2.2.4 Signaling of AMVP Information

For the AMVP mode, four parts may be signalled in the bitstream, i.e., prediction direction, reference index, MVD and my predictor candidate index.

Syntax Tables:

| Syntax tables: | |
|---|---|
| | Descriptor |
| prediction_unit( x0, y0, nPbW, nPbH ) { | |
|  if( cu_skip_flag[ x0 ][ y0 ] ) { | |
|   if( MaxNumMergeCand > 1 ) | |
|    merge_idx[ x0 ][ y0 ] | ae(v) |

-continued

Syntax tables:

| | Descriptor |
|---|---|
| `} else { /* MODE_INTER */` | |
| `  merge_flag[ x0 ][ y0 ]` | ae(v) |
| `  if( merge_flag[ x0 ][ y0 ] ) {` | |
| `    if( MaxNumMergeCand > 1 )` | |
| `      merge_idx[ x0 ][ y0 ]` | ae(v) |
| `  } else {` | |
| `    if( slice_type = = B )` | |
| `      inter_pred_idc[ x0 ][ y0 ]` | ae(v) |
| `    if( inter_pred_idc[ x0 ][ y0 ] != PRED_L1 ) {` | |
| `      if( num_ref_idx_l0_active_minus1 > 0 )` | |
| `        ref_idx_l0[ x0 ][ y0 ]` | ae(v) |
| `      mvd_coding( x0, y0, 0 )` | |
| `      mvp_l0_flag[ x0 ][ y0 ]` | ae(v) |
| `    }` | |
| `    if( inter_pred_idc[ x0 ][ y0 ] != PRED_L0 ) {` | |
| `      if( num_ref_idx_l1_active_minus1 > 0 )` | |
| `        ref_idx_l1[ x0 ][ y0 ]` | ae(v) |
| `      if( mvd_l1_zero_flag && inter_pred_idc[ x0 ][ y0 ] == PRED_BI )` | |
| `{` | |
| `        MvdL1[ x0 ][ y0 ][ 0 ] = 0` | |
| `        MvdL1[ x0 ][ y0 ][ 1 ] = 0` | |
| `      } else` | |
| `        mvd_coding( x0, y0, 1 )` | |
| `      mvp_l1_flag[ x0 ][ y0 ]` | ae(v) |
| `    }` | |
| `  }` | |
| `}` | |

7.3.8.9 Motion Vector Difference Syntax

| | Descriptor |
|---|---|
| `mvd_coding( x0, y0, refList ) {` | |
| `  abs_mvd_greater0_flag[ 0 ]` | ae(v) |
| `  abs_mvd_greater0_flag[ 1 ]` | ae(v) |
| `  if( abs_mvd_greater0_flag[ 0 ] )` | |
| `    abs_mvd_greater1_flag[ 0 ]` | ae(v) |
| `  if( abs_mvd_greater0_flag[ 1 ] )` | |
| `    abs_mvd_greater1_flag[ 1 ]` | ae(v) |
| `  if( abs_mvd_greater0_flag[ 0 ] ) {` | |
| `    if( abs_mvd_greater1_flag[ 0 ] )` | |
| `      abs_mvd_minus2[ 0 ]` | ae(v) |
| `    mvd_sign_flag[ 0 ]` | ae(v) |
| `  }` | |
| `  if( abs_mvd_greater0_flag[ 1 ] ) {` | |
| `    if( abs_mvd_greater1_flag[ 1 ] )` | |
| `      abs_mvd_minus2[ 1 ]` | ae(v) |
| `    mvd_sign_flag[ 1 ]` | ae(v) |
| `  }` | |
| `}` | |

2.3 New Inter Prediction Methods in JEM (Joint Exploration Model)

2.3.1 Sub-CU Based Motion Vector Prediction

In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.3.1.1 Alternative Temporal Motion Vector Prediction

Figure 18:
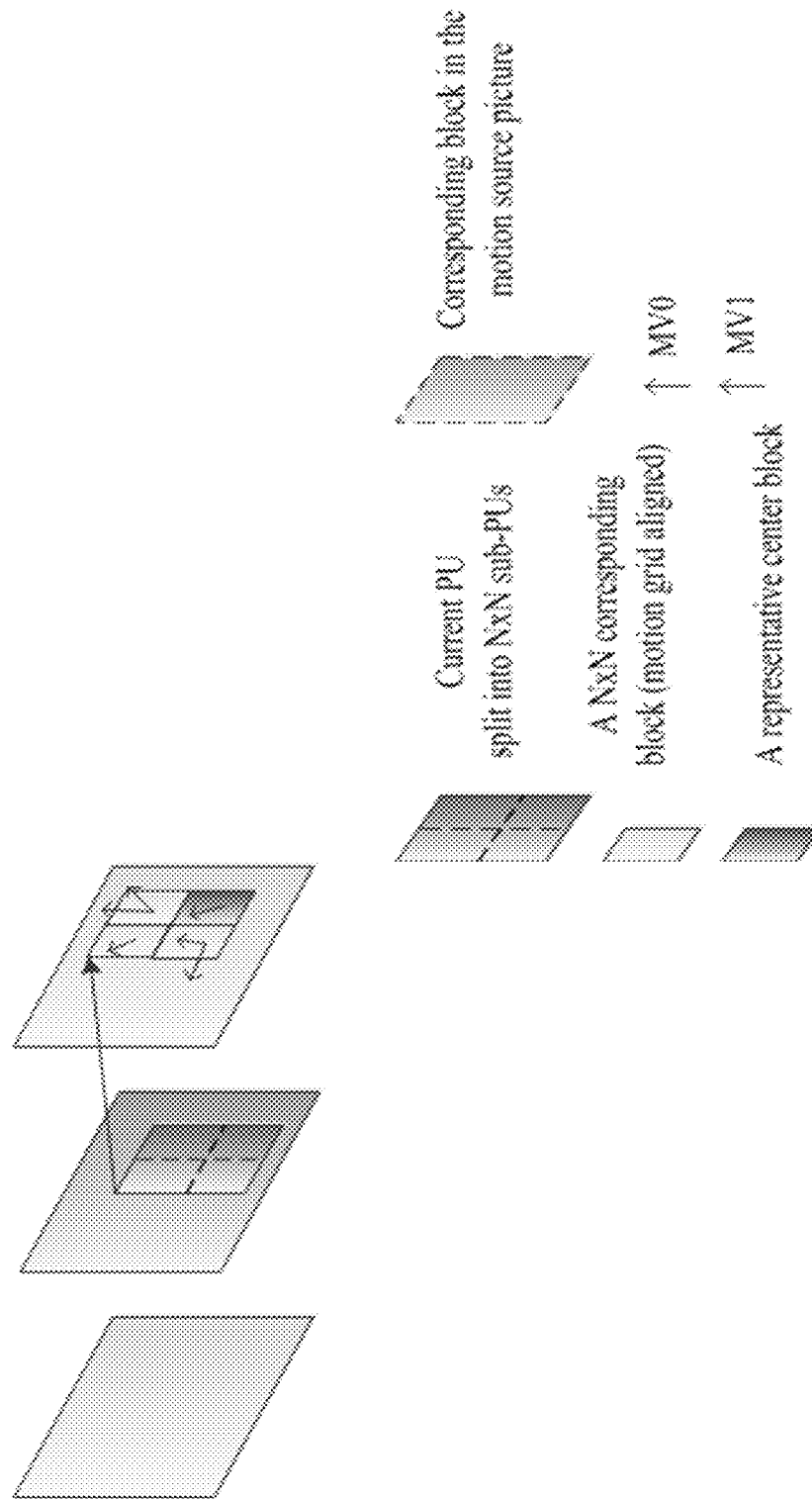
FIG. 18 shows an example Alternative Temporal Motion Vector Prediction (ATMVP for motion prediction of a CU.

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 18, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 18.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU. In one example, if the first merge candidate is from the left neighboring block (i.e., $A_1$ in FIG. 19), the associated MV and reference picture are utilized to identify the source block and source picture.

Figure 19:
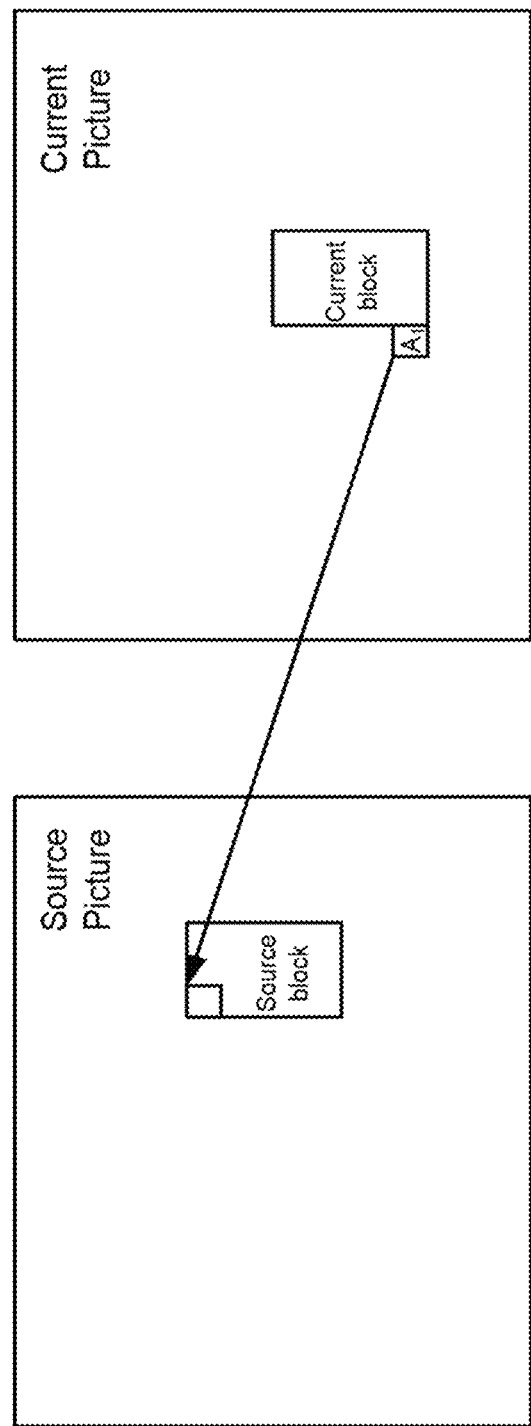
FIG. 19 pictorially depicts an example of identification of a source block and a source picture.

FIG. 19 shows an example of the identification of source block and source picture.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1-X) for each sub-CU.

2.3.1.2 Spatial-Temporal Motion Vector Prediction

Figure 20:
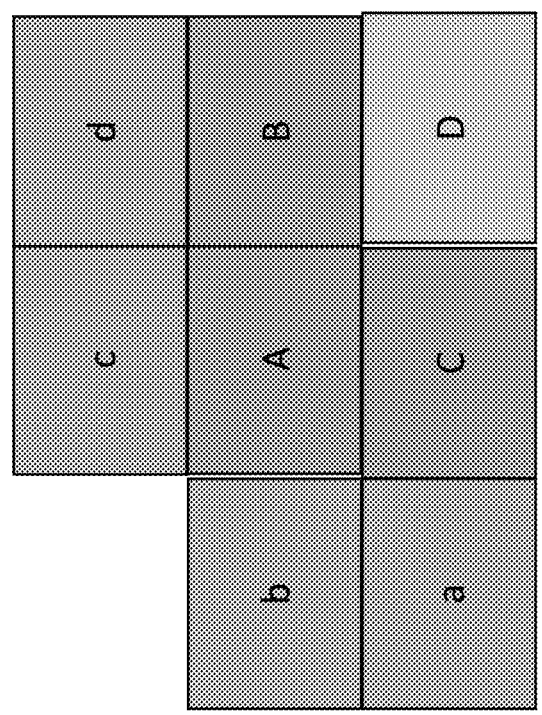
FIG. 20 shows an example of one CU with four sub-blocks and neighboring blocks.

In this method, the motion vectors of the sub-CUs are derived recursively, following raster scan order. FIG. 20 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

FIG. 20 shows an example of one CU with four sub-blocks (A-D) and its neighbouring blocks (a-d).

2.3.1.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by CABAC. While in HEVC, only the first bin is context coded and the remaining bins are context by-pass coded.

2.3.2 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.3.3 Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \qquad (1)$$

Figure 21:
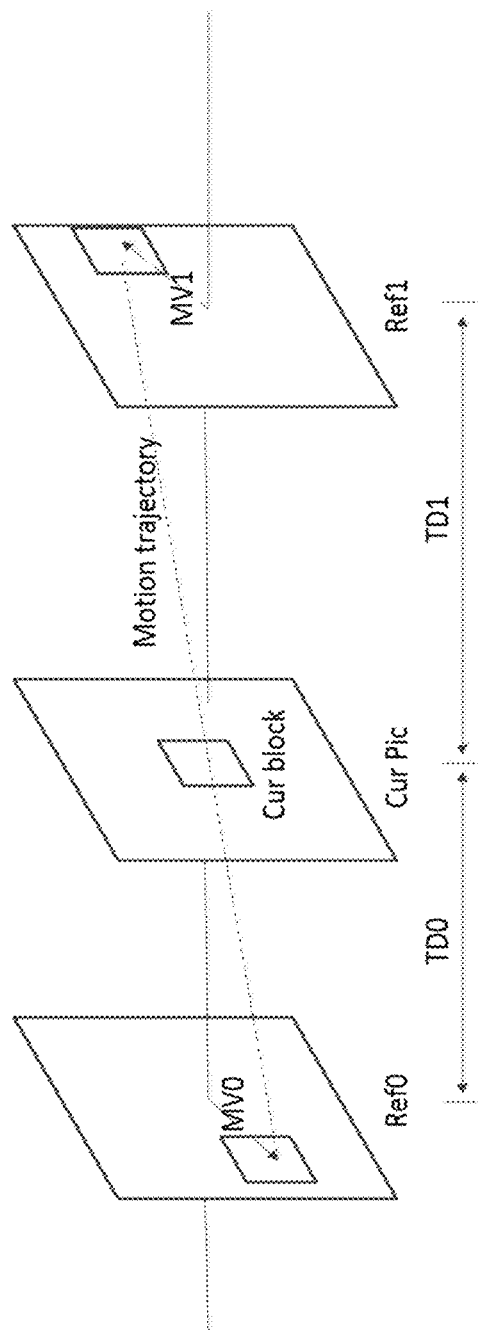
FIG. 21 illustrates an example of bilateral matching.

As shown in the FIG. 21, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 22:
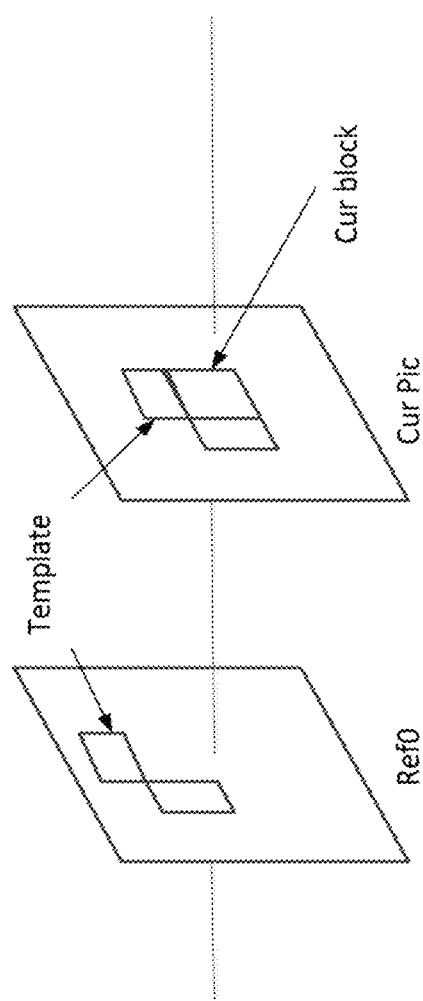
FIG. 22 illustrates an example of template matching.

As shown in FIG. 22, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

2.3.3.1 CU Level MV Candidate Set

The MV candidate set at CU level consists of:
(i) Original AMVP candidates if the current CU is in AMVP mode
(ii) all merge candidates,
(iii) several MVs in the interpolated MV field.
(iv) top and left neighbouring motion vectors When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

2.3.3.2 Sub-CU Level MV Candidate Set

The MV candidate set at sub-CU level consists of:
(i) an MV determined from a CU-level search,
(ii) top, left, top-left and top-right neighbouring MVs,
(iii) scaled versions of collocated MVs from reference pictures,
(iv) up to 4 ATMVP candidates,
(v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

2.3.3.3 Generation of Interpolated MV Field

Before coding a frame, interpolated motion field is generated for the whole picture based on unilateral ME. Then the motion field may be used later as CU level or sub-CU level MV candidates.

Figure 23:
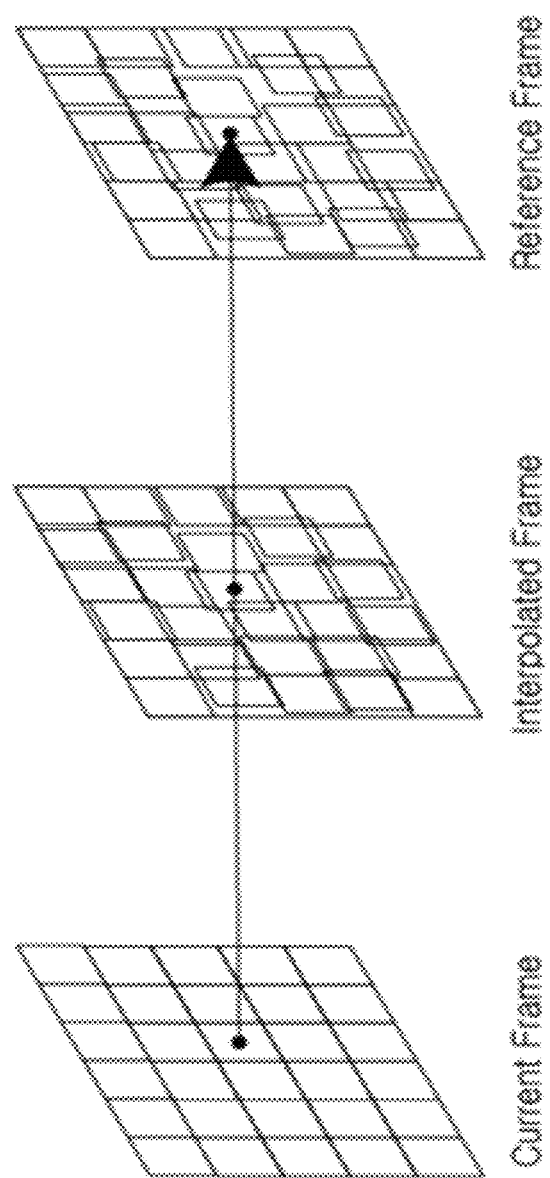
FIG. 23 depicts an example of unilateral Motion Estimation (ME) in Frame Rate UpConversion (FRUC).

First, the motion field of each reference pictures in both reference lists is traversed at 4×4 block level. For each 4×4 block, if the motion associated to the block passing through a 4×4 block in the current picture (as shown in FIG. 23) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

2.3.3.4 Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad (2)$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

2.3.3.5 MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

2.3.3.6 Selection of Prediction Direction in Template Matching FRUC Merge Mode In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

If costBi<=factor*min (cost0, cost1)
  bi-prediction is used;
Otherwise, if cost0<=cost1
  uni-prediction from list0 is used;
Otherwise,
  uni-prediction from list1 is used;

where cost0 is the SAD of list0 template matching, cost1 is the SAD of list1 template matching and costBi is the SAD of bi-prediction template matching. The value of factor is equal to 1.25, which means that the selection process is biased toward bi-prediction. The inter prediction direction selection is only applied to the CU-level template matching process.

2.3.4 Decoder-Side Motion Vector Refinement

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 24:
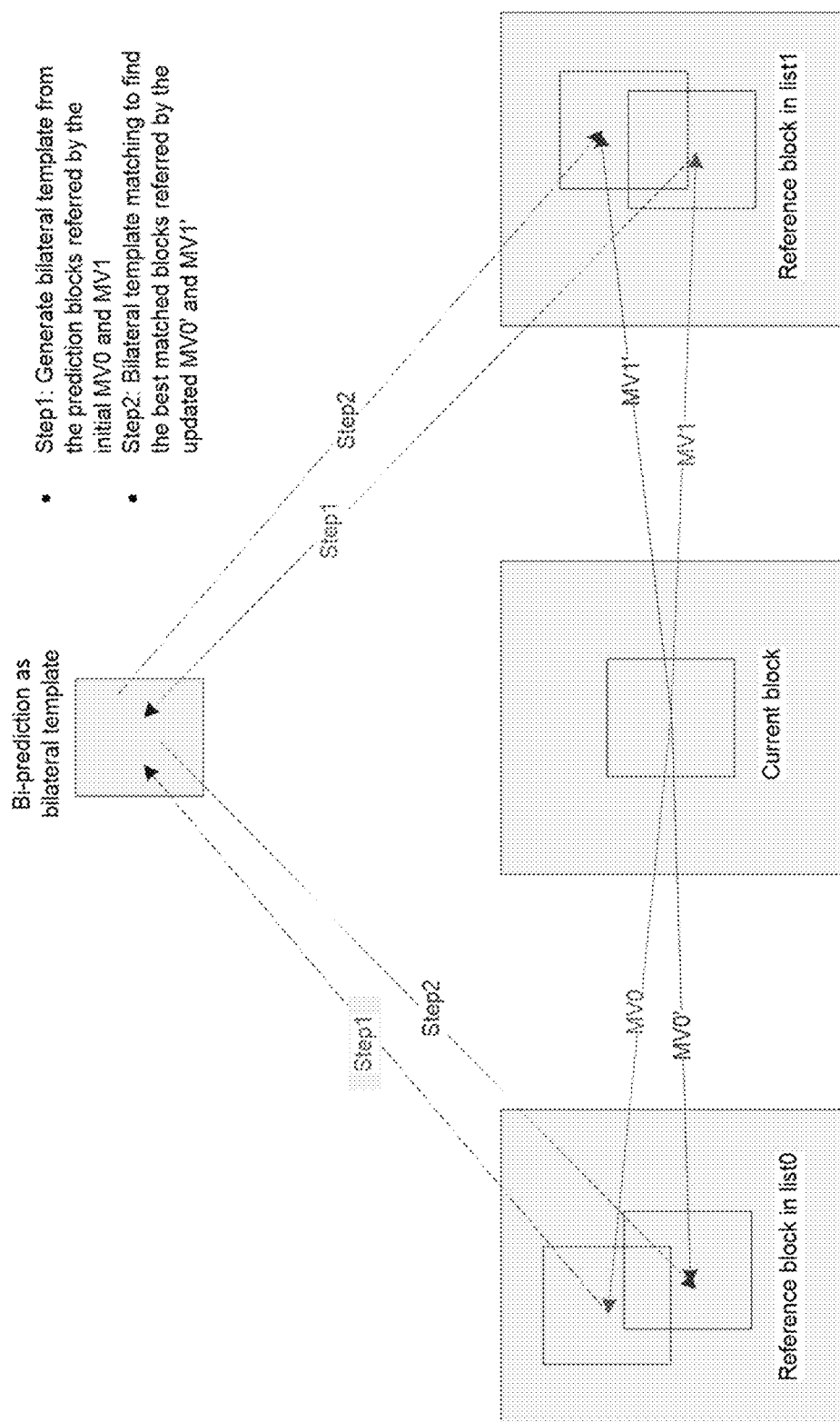
FIG. 24 shows an example of DMVR based on bilateral template matching.

In DMVR, a bilateral template is generated as the weighted combination (i.e. average) of the two prediction blocks, from the initial MV0 of list0 and MV1 of list1, respectively, as shown in FIG. 23. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 24, are used for generating the final bi-prediction results. A sum of absolute differences (SAD) is used as the cost measure.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

2.3.5 Merge/Skip Mode with Bilateral Matching Refinement

Figure 25:
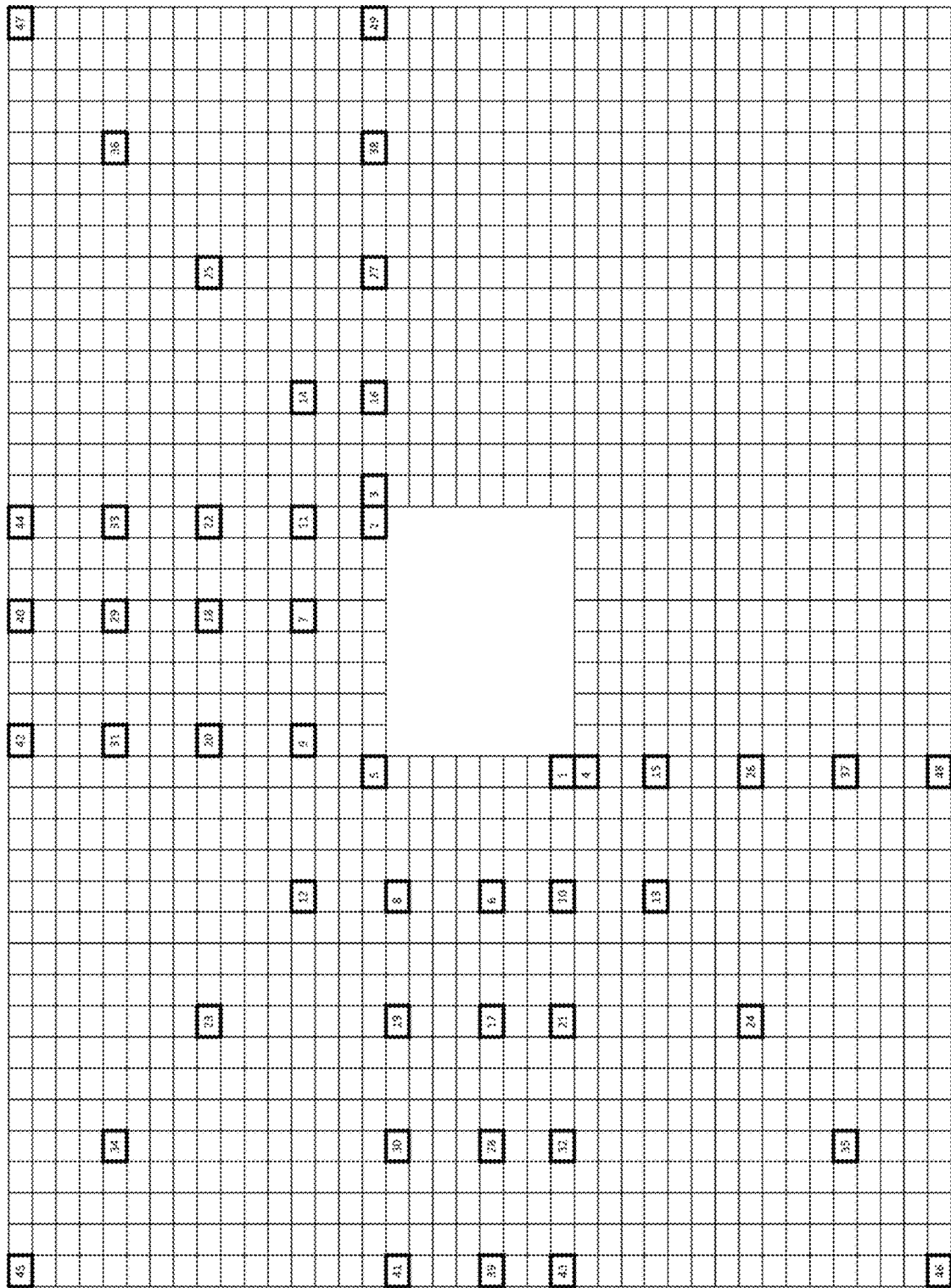
FIG. 25 shows an example of spatially neighboring blocks used to derive spatial merge candidates.

A merge candidate list is first constructed by inserting the motion vectors and reference indices of the spatial neighboring and temporal neighboring blocks into the candidate list with redundancy checking until the number of the available candidates reaches the maximum candidate size of 19. The merge candidate list for the merge/skip mode is constructed by inserting spatial candidates (FIG. 11), temporal candidates, affine candidates, advanced temporal MVP (ATMVP) candidate, spatial temporal MVP (STMVP) candidate and the additional candidates as used in HEVC (Combined candidates and Zero candidates) according to a pre-defined insertion order:

Spatial candidates for blocks 1-4.
Extrapolated affine candidates for blocks 1-4.
ATMVP.
STMVP.
Virtual affine candidate.
Spatial candidate (block 5) (used only when the number of the available candidates is smaller than 6).
Extrapolated affine candidate (block 5).
Temporal candidate (derived as in HEVC).
Non-adjacent spatial candidates followed by extrapolated affine candidate (blocks 6 to 49, as depicted in FIG. 25).
Combined candidates.
Zero candidates It is noted that IC flags are also inherited from merge candidates except for STMVP and affine. Moreover, for the first four spatial candidates, the bi-prediction ones are inserted before the ones with uni-prediction.

In some implementations, blocks which are not connected with the current block may be accessed. If a non-adjacent block is coded with non-intra mode, the associated motion information may be added as an additional merge candidate.

3. Examples of Problems Addressed by Embodiments Disclosed Herein

The current HEVC design could take the correlation of current block its neighbouring blocks (next to the current block) to better code the motion information. However, it is possible that that the neighbouring blocks correspond to different objects with different motion trajectories. In this case, prediction from its neighbouring blocks is not efficient.

Prediction from motion information of non-adjacent blocks could bring additional coding gain with the cost of storing all the motion information (typically on 4×4 level) into cache which significantly increase the complexity for hardware implementation.

4. Some Examples

To overcome the drawbacks of existing implementations, LUT-based motion vector prediction techniques using one or more look up tables with at least one motion candidate stored to predict motion information of a block can be implemented in various embodiments to provide video coding with higher coding efficiencies. Each LUT can include one or more motion candidates, each associated with corresponding motion information. Motion information of a motion candidate can include partial or all of the prediction direction, reference indices/pictures, motion vectors, LIC flags, affine flags, Motion Vector Derivation (MVD) precisions, and/or MVD values. Motion information may further include the block position information to indicate wherein the motion information is coming from.

The LUT-based motion vector prediction based on the disclosed technology, which may enhance both existing and future video coding standards, is elucidated in the following examples described for various implementations. Because the LUTs allow the encoding/decoding process to be performed based on historical data (e.g., the blocks that have been processed), the LUT-based motion vector prediction can also be referred to as History-based Motion Vector Prediction (HMVP) method. In the LUT-based motion vector prediction method, one or multiple tables with motion information from previously coded blocks are maintained during the encoding/decoding process. During the encoding/decoding of one block, the associated motion information in LUTs may be added to the motion candidate lists, and after encoding/decoding one block, LUTs may be updated. The examples below should be considered as examples to explain general concepts. These examples should not be interpreted in a narrow way. Furthermore, these examples can be combined in any manner.

Some embodiments may use one or more look up tables with at least one motion candidate stored to predict motion information of a block. Embodiments may use motion candidate to indicate a set of motion information stored in a look up table. For conventional AMVP or merge modes, embodiments may use AMVP or merge candidates for storing the motion information.

The example embodiments below explain some concepts.

Examples of Look-Up Tables

Example 1: Each look up table may contain one or more motion candidates wherein each candidate is associated with its motion information.
- a. Motion information of a motion candidate here may include partial or all of the prediction direction, reference indices/pictures, motion vectors, LIC flag, affine flag, MVD precision, MVD values.
- b. Motion information may further include the block position information and/or block shape to indicate wherein the motion information is coming from.
- c. A counter may be further assigned for each look up table.
  - i. The counter may be initialized to be zero at the beginning of encoding/decoding a picture/slice/LCU (CTU) row/tile.
  - ii. In one example, the counter may be updated after encoding/decoding a CTU/CTB/CU/CB/PU/a certain region size (e.g., 8×8 or 16×16).
  - iii. In one example, the counter is increased by one each time one candidate is added into the lookup table.
  - iv. In one example, the counter should be no larger than the table size (number of allowed motion candidates).
  - v. Alternatively, the counter may be used to indicate how many motion candidates have been tried to be added to the look up tables (some of them was in the look up table but later may be removed from the table). In this case, the counter could be larger than the table size.
- d. The table size (number of allowed motion candidates) and/or number of tables may be the fixed or adaptive. The table size may be same for all tables, or different for different tables.
  - i. Alternatively, different sizes may be used for different look-up tables (e.g., 1 or 2).
  - ii. In one example, the table sizes and/or number of tables may be pre-defined.
  - iii. In one example, the table sizes and/or number of tables may be signalled in Video Parameter Set (VPS), Sequence Parameter Set (SPS), Picture Parameter Set (PPS), Slice header, tile header, Coding Tree Unit (CTU), Coding Tree Block (CTB), Coding Unit (CU) or Prediction Unit (PU), region covering multiple CTU/CTB/CU/PUs.
  - iv. The table size and/or number of tables may further depend on the slice type, temporal layer index of a picture, picture order count (POC) distance between one slice and the closest intra slice.
- e. Suppose there are N tables used for a coding thread, N*P tables may be required for coding a slice, wherein P indicates the number of LCU rows or the number of tiles.
  - i. Alternatively, only P tables may be required for coding a slice, wherein P indicates the number of LCU rows wherein each LCU row only use one look up table even N could be larger than 1 when tile is disabled.

Selection of LUTs

Example 2: For coding a block, partial or all of motion candidates from one look up table may be checked in order. When one motion candidate is checked during coding a block, it may be added to the motion candidate list (e.g., AMVP, merge candidate lists).
- a. Alternatively, motion candidates from multiple look up tables may be checked in order.
- b. The look up table indices may be signaled in CTU, CTB, CU or PU, or a region covering multiple CTU/CTB/CU/PUs.

Example 3: The selection of look up tables may depend on the position of a block.
- a. It may depend on the CTU address covering the block. Here, we take two look up tables (Dual Look Up Tables, DLUT) for an example to illustrate the idea:

i. If the block is located at one of the first M CTUs in a CTU row, the first look up table may be utilized for coding the block, while for blocks located in the remaining CTUs in the CTU row, the second look up table may be utilized.

ii. If the block is located at one of the first M CTUs in a CTU row, motion candidates of the first look up table may firstly checked for coding the block, if there are not enough candidates in the first table, the second look up table may be further utilized, while for blocks located in the remaining CTUs in the CTU row, the second look up table may be utilized.

iii. Alternatively, for blocks located in the remaining CTUs in the CTU row, motion candidates of the second look up table may firstly checked for coding the block, if there are not enough candidates in the second table, the first look up table may be further utilized.

b. It may depend on the distance between the position of the block and the position associated with one motion candidate in one or multiple look up tables.

i. In one example, if one motion candidate is associated with a smaller distance to the block to be coded, it may be checked earlier compared to another motion candidate.

Usage of Look Up Tables

Example 4: The total number of motion candidates in a look up table to be checked may be pre-defined.

a. It may further depend on the coded information, block size, block shape and etc. al. For example, for the AMVP mode, only m motion candidates may be checked while for the merge mode, n motion candidates may be checked (e.g., m=2, n=44).

b. In one example, the total number of motion candidates to be checked may be signalled in Video Parameter Set (VPS), Sequence Parameter Set (SPS), Picture Parameter Set (PPS), Slice header, tile header, Coding Tree Unit (CTU), Coding Tree Block (CTB), Coding Unit (CU) or Prediction Unit (PU), region covering multiple CTU/CTB/CU/PUs.

Example 5: The motion candidate(s) included in a look up table may be directly inherited by a block.

a. They may be used for the merge mode coding, i.e., motion candidates may be checked in the merge candidate list derivation process.

b. They may be used for the affine merge mode coding.

i. A motion candidate in a look up table can be added as an affine merge candidate if its affine flag is one.

c. Checking of motion candidates in look up tables may be enabled when:

i. the merge candidate list is not full after inserting the TMVP candidate;

ii. the merge candidate list is not full after checking a certain spatial neighboring block for spatial merge candidate derivation;

iii. the merge candidate list is not full after all spatial merge candidates;

iv. the merge candidate list is not full after combined bi-predictive merge candidates;

v. when the number of available merge candidates (e.g., including spatial or temporal (e.g., including adjacent spatial and non-adjacent spatial, TMVP, STMVP, ATMVP, etc. merge candidates) that have been put into the merge candidate list from other coding methods (e.g., the merge derivation process of HEVC design, or JEM design) before checking the motion candidates in LUTs is less than the maximumly allowed merge candidates minus a given threshold.

1. in one example, the threshold is set to 1 or 0.

2. Alternatively, the threshold may be signaled or pre-defined in SPS/PPS/sequence, picture, slice header/tile.

3. Alternatively, the threshold may be adaptively changed from block to block. For example, it may be dependent on coded block information, like block size/block shape/slice type, and/or dependent on the number of available spatial or temporal merge candidates.

4. In another example, when the number of a certain kind of merge candidates than have been put into the merge candidate list is less than the maximumly allowed merge candidates minus a given threshold. The "certain kind of merge candidates" may be spatial candidates as in HEVC or non-adjacent merge candidates.

vi. Pruning may be applied before adding a motion candidate to the merge candidate list.

1. In one example, a motion candidate may be pruned to all or partial of the available spatial or temporal (e.g., including adjacent spatial and non-adjacent spatial, TMVP, STMVP, ATMVP, etc. al) merge candidates from other coding methods in the merge candidate list.

2. a motion candidate may be NOT pruned to sub-block based motion candidates, e.g., ATMVP, STMVP.

3. In one example, a current motion candidate may be pruned to all or partial of the available motion candidates (inserted before the current motion candidate) in the merge candidate list.

4. Number of pruning operations related to motion candidates (that is, how many times that motion candidates need to be compared to other candidates in the merge list) may depend on the number of available spatial or temporal merge candidates. For example, when checking a new motion candidate, if there are M candidates available in the merge list, the new motion candidate may be only compared to the first K (K<=M) candidates. If the pruning function returns false (e.g., not identical to any of the first K candidates), the new motion candidate is considered to be different from all of the M candidates and it could be added to the merge candidate list.

5. In one example, a newly appended motion candidate is only compared with the first N candidate in the merge candidate list. For example, N=3, 4 or 5. N may be signaled from the encoder to the decoder.

6. one example, a new motion candidate to be checked is only compared with the last N candidate in the merge candidate list. For example, N=3, 4 or 5. N may be signaled from the encoder to the decoder.

Example 6: The motion candidate(s) included in a look up table may be used as a predictor for coding motion information of a block.

a. They may be used for the AMVP mode coding, i.e., motion candidates may be checked in the AMVP candidate list derivation process.

b. Checking of motion candidates in look up tables may be enabled when:

i. the AMVP candidate list is not full after inserting the TMVP candidate;
ii. the AMVP candidate list is not full after selecting from spatial neighbors and pruning, right before inserting the TMVP candidate;
iii. when there is no AMVP candidate from above neighboring blocks without scaling and/or when there is no AMVP candidate from left neighboring blocks without scaling
iv. Pruning may be applied before adding a motion candidate to the AMVP candidate list.
v. Similar rules as mentioned in bullet 5.(3) (4) may be applied to AMVP mode
c. Motion candidates with identical reference picture to the current reference picture is checked.
i. Alternatively, in addition, motion candidates with different reference pictures from the current reference picture are also checked (with MV scaled).
ii. Alternatively, all motion candidates with identical reference picture to the current reference picture are first checked, then, motion candidates with different reference pictures from the current reference picture are checked.
iii. Alternatively, motion candidates are checked following the same in merge.

Example 7: The checking order of motion candidates in a look up table is defined as follows (suppose K (K>=1) motion candidates are allowed to be checked):
a. The last K motion candidates in the look up table, e.g., in descending order of entry indices to the LUT.
b. The first K % L candidates wherein L is the look up table size when K>=L, e.g., in descending order of entry indices to the LUT.
c. All the candidates (L candidates) in the look up table when K>=L, based on an order. In one example, the first K % L candidates in the table are checked in descending order of entry indices to the LUT, and then check the last (L–K % L) candidates in descending order of entry indices.
d. Alternatively, furthermore, based on the descending order of motion candidate indices.
e. Alternatively, selecting K motion candidates based on the candidate information, such as the distance of positions associated with the motion candidates and current block.
i. In one example, K nearest motion candidates are selected.
ii. in one example, the candidate information may further consider block shape when calculating the distance
f. How many and how to select motion candidates from a look table may depend on the coded information, such as block size/block shape.
i. In one example, for a smaller block size, instead of choosing the last K motion candidates, the other K motion candidates (starting not from the last one) may be chosen.
g. In one example, maximum number of motion candidates in a look up table to be checked (i.e., which may be added to the merge/amvp candidate list) may depend on the number of available motion candidates (denoted by $N_{avaiMCinLUT}$) in a look up table, and/or maximally allowed motion candidates (denoted by $NUM_{maxMC}$) to be added (which may be pre-defined or signaled), and/or number of available candidates (denoted by $N_{avaiC}$) in a candidate list before checking the candidates from the look up table.
i. In one example, maximum number of motion candidates in the look up table to be checked is set to minimum value of ($N_{avaiMCinLUT}$, $NUM_{maxMC}$, $N_{avaiC}$).
ii. Alternatively, maximum number of motion candidates in the look up table to be checked is set to minimum value of ($N_{avaiMCinLUT}$, $NUM_{maxMC}$–$N_{avaiC}$).
iii. In one example, $N_{avaiC}$ denotes the number of inserted candidates derived from spatial or temporal (adjacent and/or non-adjacent) neighboring blocks. Alternatively, furthermore, the number of sub-block candidates (like AMTVP, STMVP) is not counted in $N_{avaiC}$.
iv. $NUM_{maxMC}$ may depend on the coded mode, e.g., for merge mode and AMVP mode, $NUM_{maxMC}$ may be set to different values. In one example, for merge mode, $NUM_{maxMC}$ may be set to 4, 6, 8, 10, etc. al. for AMVP mode, $NUM_{maxMC}$ may be set to 1, 2, 4, etc. al.
v. Alternatively, $NUM_{maxMC}$ may depend on other coded information, like block size, block shape, slice type etc. al.
h. The checking order of different look up tables is defined in usage of look up tables in the next subsection.
i. The checking process will terminate once the merge/AMVP candidate list reaches the maximumly allowed candidate numbers.
j. The checking process will terminate once the merge/AMVP candidate list reaches the maximumly allowed candidate numbers minus a threshold (Th). In one example, Th may be pre-defined as a positive integer value, e.g., 1, or 2, or 3. Alternatively, Th may be adaptively changed from block to block. Alternatively, Th may be signaled in the SPS/PPS/slice header etc. al. Alternatively, Th may further depend on block shape/block size/coded modes etc. Alternatively, Th may depend on how many available candidates before adding the motion candidates from LUTs.
k. Alternatively, it will terminate once the number of added motion candidates reaches the maximumly allowed motion candidate numbers. The maximumly allowed motion candidate numbers may be signaled or pre-defined. Alternatively, the maximumly allowed motion candidate numbers may further depend on block shape/block size/coded modes etc.
l. One syntax element to indicate the table size as well as the number of motion candidates (i.e., K=L) allowed to be checked may be signaled in SPS, PPS, Slice header, tile header.

Example 8: Enabling/disabling the usage look up tables for motion information coding of a block may be signalled in SPS, PPS, Slice header, tile header, CTU, CTB, CU or PU, region covering multiple CTU/CTB/CU/PUs.

Example 9: Whether to apply prediction from look up tables may further depend on the coded information. When it is inferred not to apply for a block, additional signaling of indications of the prediction is skipped. Alternatively, when it is inferred not to apply for a block, there is no need to access motion candidates of look up tables, and the checking of related motion candidates is omitted.
a. Whether to apply prediction from look up tables may depend on block size/block shape. In one example, for smaller blocks, such as 4×4, 8×4 or 4×8 blocks, it is disallowed to perform prediction from look up tables.
b. Whether to apply prediction from look up tables may depend on whether the block is coded with AMVP or merge mode. In one example, for the AMVP mode, it is disallowed to perform prediction from look up tables.
  c. Whether to apply prediction from look up tables may depend on the block is coded with affine motion or other kinds of motion (such as translational motion). In one example, for the affine mode, it is disallowed to perform prediction from look up tables.

Example 10: Motion candidates of a look up table in previously coded frames/slices/tiles may be used to predict motion information of a block in a different frame/slice/tile.
  a. In one example, only look up tables associated with reference pictures of current block may be utilized for coding current block.
  b. In one example, only look up tables associated with pictures with the same slice type and/or same quantization parameters of current block may be utilized for coding current block.

Update of Look Up Tables

Example 11: After coding a block with motion information (i.e., IntraBC mode, inter coded mode), one or multiple look up tables may be updated.
  a. In one example, whether to update a look up table may reuse the rules for selecting look up tables, e.g., when a look up table could be selected for coding the current block, after coding/decoding the block, the selected look up table may further be updated.
  b. Look up tables to be updated may be selected based on coded information, and/or positions of the block/LCU.
  c. If the block is coded with motion information directly signaled (such as AMVP mode), the motion information for the block may be added to a look up table.
    i. Alternatively, if the block is coded with motion information directly inherited from a spatial neighboring block without any refinement (e.g., spatial merge candidate without refinement), the motion information for the block shouldn't be added to a look up table.
    ii. Alternatively, if the block is coded with motion information directly inherited from a spatial neighboring block with refinement (such as DMVR, FRUC), the motion information for the block shouldn't be added to any look up table.
    iii. Alternatively, if the block is coded with motion information directly inherited from a motion candidate stored in a look up table, the motion information for the block shouldn't be added to any look up table.
  d. M (M>=1) representative position within the block is chosen and the motion information associated with the representative is used to update look up tables.
    i. In one example, the representative position is defined as one of the four corner positions (e.g., C0-C3 in FIG. 26) within the block.
    ii. In one example, the representative position is defined as the center position (e.g., Ca-Cd in FIG. 26) within the block.
    iii. When sub-block prediction is disallowed for block, M is set to 1.
    iv. When sub-block prediction is allowed for block, M could be set to 1 or total number of sub-blocks or any other value between [1, number of sub-blocks] exclusively.
    v. Alternatively, when sub-block prediction is allowed for block, M could be set to 1 and the selection of a representative sub-block is based on
      1. the frequency of utilized motion information,
      2. whether it is a bi-prediction block
      3. based on the reference picture index/reference picture
      4. motion vector differences compared to other motion vectors (e.g., selecting the maximum MV differences)
      5. other coded information.
  e. When M (M>=1) sets of representative positions are selected to update look up tables, further conditions may be checked before adding them as additional motion candidates to look up tables.
    i. Pruning may be applied to the new sets of motion information to the existing motion candidates in the look up table.
    ii. In one example, a new set of motion information shouldn't be identical to any or partial of existing motion candidates in the look up table.
    iii. Alternatively, for same reference pictures from a new set of motion information and one existing motion candidate, the MV difference should be no smaller than one/multiple thresholds. For example, horizontal and/or vertical component of the MV difference should be larger than 1-pixel distance.
    iv. Alternatively, the new sets of motion information are only pruned with the last K candidates or the first K % L existing motion candidates when K>L to allow reactivating the old motion candidates.
    v. Alternatively, no pruning is applied.
  f. If M sets of motion information are used to update a look up table, the corresponding counter should be increased by M.
  g. Suppose a counter of a look up table to be updated is denoted by K before coding the current block, after coding the block, for one selected set of motion information (with methods mentioned above 0, it is added as an additional motion candidate with index equal to K % L (wherein L is the look up table size). Examples are shown in FIGS. 27A and 27B
    i. Alternatively, it is added as an additional motion candidate with index equal to min(K+1, L−1). Alternatively, furthermore, if K>=L, the first motion candidate (index equal to 0) is removed from the look-up table, and the following K candidates indices are reduced by 1.
    ii. For above both methods (either adding the new motion candidate to entry index equal to K % L or adding it with index equal to min(K+1, L−1)), they are trying to keep the latest few sets of motion information from previously coded blocks regardless whether there are identical/similar motion candidates.
    iii. Alternatively, when adding a new set of motion information as a motion candidate to a LUT, redundancy checking is firstly applied. In this case, the LUT will keep the latest several sets of motion information from previously coded blocks, however, redundant ones may be removed from LUTs. Such a method is called redundancy-removal based LUT updating method.
      1. If there are redundant motion candidates in the LUT, the counter associated with the LUT may be not increased or decreased.
      2. The redundant checking may be defined as the pruning process in merge candidate list construction process, e.g., checking whether the reference pictures/reference picture indices are the same, and motion vector differences are within a range or identical.

3. If there is a redundant motion candidate found in a LUT, the redundant motion candidate is moved from its current position to the last one of the LUT.
   a. Similarly, if there is a redundant motion candidate found in a LUT, this redundant motion candidate is removed from the LUT. In addition, all the motion candidates inserted to LUT after the redundant motion candidate move forward to refill the removed entry of the redundant motion candidate. After the shifting, the new motion candidate is added to the LUT.
   b. In this case, the counter is kept unchanged.
   c. One a redundant motion candidate is identified in a LUT, the redundant checking process is terminated.
4. Multiple redundant motion candidates may be identified. In this case, all of them are removed from the LUT. In addition, all of the remaining motion candidates may move forward in order.
   a. In this case, the counter is decreased by (number of redundant motion candidates minus 1).
   b. The redundant checking process is terminated after identifying maxR redundant motion candidates (maxR is a positive integer variable).
5. The redundancy checking process may start from the first to the last motion candidate (i.e., in the order of added to LUTs, in the order of decoding process of blocks where motion information is from).
6. Alternatively, when there are redundant motion candidates in LUT, instead of removing one or multiple of redundant ones form LUTs, virtual motion candidates may be derived from redundant ones and the virtual motion candidates may be used to replace the redundant ones.
   a. Virtual motion candidates may be derived from a redundant motion candidate by adding offset(s) to horizontal and/or vertical component of one or multiple motion vectors; or average of two motion vectors if pointing to the same reference pictures. Alternatively, the virtual motion candidate may be derived from any function with motion vectors in the look up table as the input. Exemplary functions are: Adding two or motion vectors together; Averaging two or more motion vectors. The motion vectors may be scaled before being input into the function.
   b. Virtual motion candidates may be added to the same position as the redundant motion candidates.
   c. Virtual motion candidates may be added before all the other motion candidates (e.g., starting from smallest entry indices, like zero).
   d. In one example, it is applied only under certain conditions, such as when the current LUT is not full.
7. The redundancy-removal based LUT updating method may be invoked under certain conditions, such as
   a. the current block is coded with merge mode,
   b. the current block is coded with AMVP mode but with at least one component of MV difference is non-zero;
   c. the current block is or is not coded with sub-block based motion prediction/motion compensation methods (e.g., not coded with affine mode)
   h. The look-up table may be emptied after coding one intra-constrained block.
   i. If an entry of motion information is added into the lookup table, more entries of motion information may also be added into the table by derivation from the motion information. In this case, the counter associated with the look up table may be increased more than 1.
      i. In one example, the MV of an entry of motion information is scaled and put into the table;
      ii. In one example, the MV of an entry of motion information is added by (dx, dy) and put into the table;
      iii. In one example, the average of MVs of two or more entries of motion information is calculated and put into the table.

Example 12: If one block is located at a picture/slice/tile border, updating of look up tables may be always disallowed.

Example 13: Motion information of above LCU rows may be disabled to code the current LCU row.
   a. In this case, at the beginning of a new slice/tile/LCU row, the number of available motion candidates may be reset to 0.

Example 14: At the beginning of coding a slice/tile with a new temporal layer index, the number of available motion candidates may be reset to 0.

Example D5: The look up table may be continuously updated with one slice/tile/LCU row/slices with same temporal layer index.
   a. Alternatively, the look up table may be updated only after coding/decoding each S (S>=1) CTUs/CTBs/CUs/CBs or after coding/decoding a certain region (e.g., size equal to 8×8 or 16×16).
   b. Alternatively, the look up table may be updated only after coding/decoding each S (S>=1) blocks (e.g., CUs/CBs) with certain modes (e.g., S inter-coded blocks). Alternatively, the look up table may be updated only after coding/decoding each S (S>=1) inter-coded blocks (e.g., CUs/CBs) which are not coded with sub-block based motion prediction/motion compensation method (e.g., not coded with affine and/or ATMVP mode).
   c. Alternatively, the look up table may be updated only when the left-top coordinate of the coded/decoded block satisfies some conditions. For example, the look up table is updated only when (x&M==0)&& (y&M==0), where (x, y) is left-top coordinate of the coded/decoded block. M is an integer such as 2, 4, 8, 16, 32, or 64.
   d. Alternatively, one look up table may stop updating once it reaches a maximumly allowed counter.
   e. In one example, the counter may be predefined. Alternatively, it be signalled in Video Parameter Set (VPS), Sequence Parameter Set (SPS), Picture Parameter Set (PPS), Slice header, tile header, Coding Tree Unit (CTU), Coding Tree Block (CTB), Coding Unit (CU) or Prediction Unit (PU), region covering multiple CTU/CTB/CU/PUs.

Additional Example Embodiments

Figure 29:
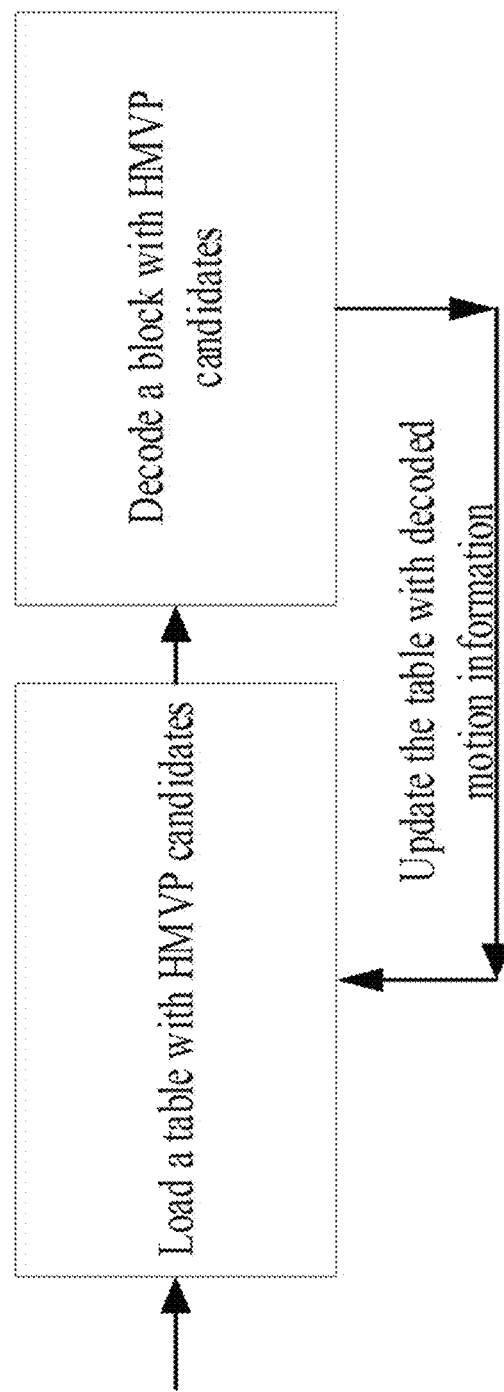
FIG. 29 shows an example of a decoding flow chart with the proposed HMVP method.

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded block, the associated motion information is added to the last entry of the table as a new HMVP candidate. The overall coding flow is depicted in FIG. 29.

In one example, the table size is set to be L (e.g., L=16 or 6, or 44), which indicates up to L HMVP candidates may be added to the table.

Figure 30:
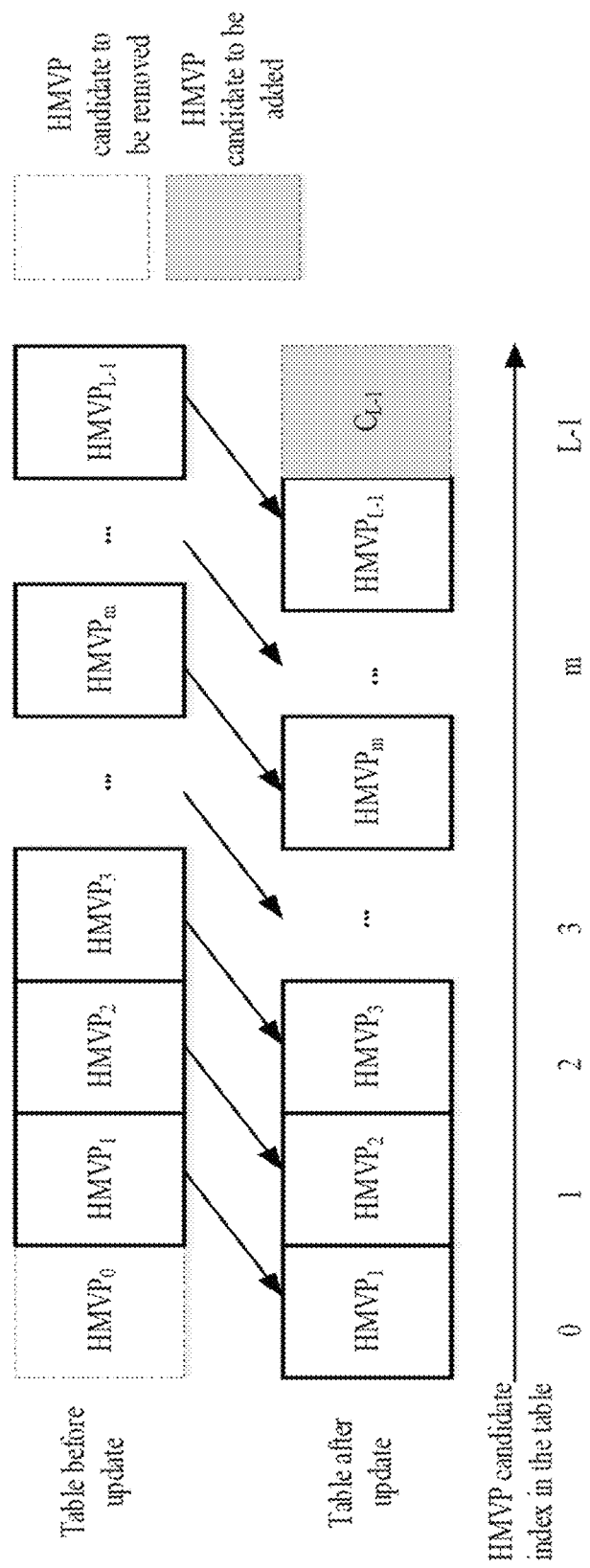
FIG. 30 shows examples of updating tables using the proposed HMVP method.

In one embodiment (corresponding to example 11.g.i), if there are more than L HMVP candidates from the previously coded blocks, a First-In-First-Out (FIFO) rule is applied so that the table always contains the latest previously coded L motion candidates. FIG. 30 depicts an example wherein the FIFO rule is applied to remove a HMVP candidate and add a new one to the table used in the proposed method.

In another embodiment (corresponding to example 11.g.iii), whenever adding a new motion candidate (such as the current block is inter-coded and non-affine mode), a redundancy checking process is applied firstly to identify whether there are identical or similar motion candidates in LUTs.

Figure 31:
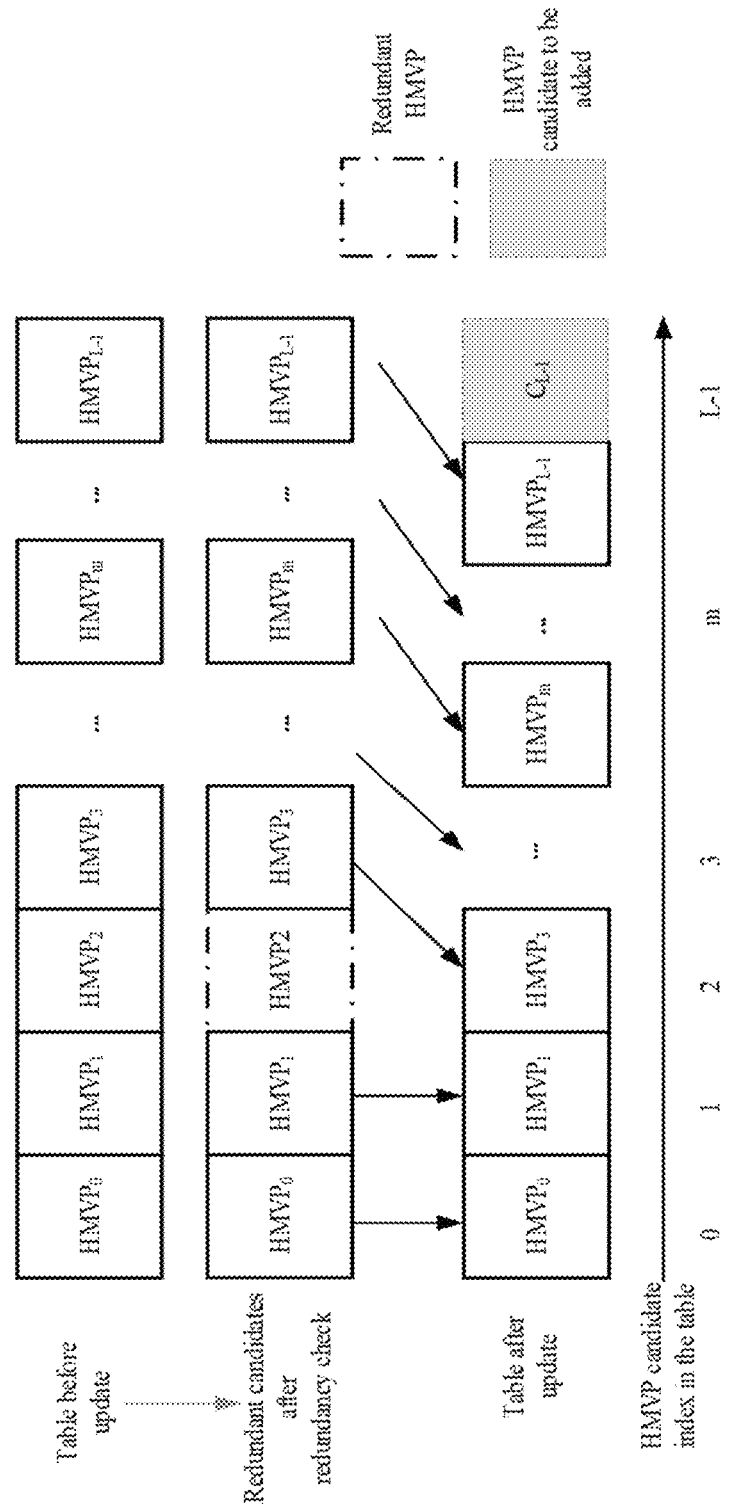
FIG. 31 and FIG. 32 show examples of a redundancy-removal based LUT updating method (with one redundancy motion candidate removed).

Some examples are depicted as follows:

FIG. 31 shows an example when the LUT is full before adding a new motion candidate.

Figure 32:
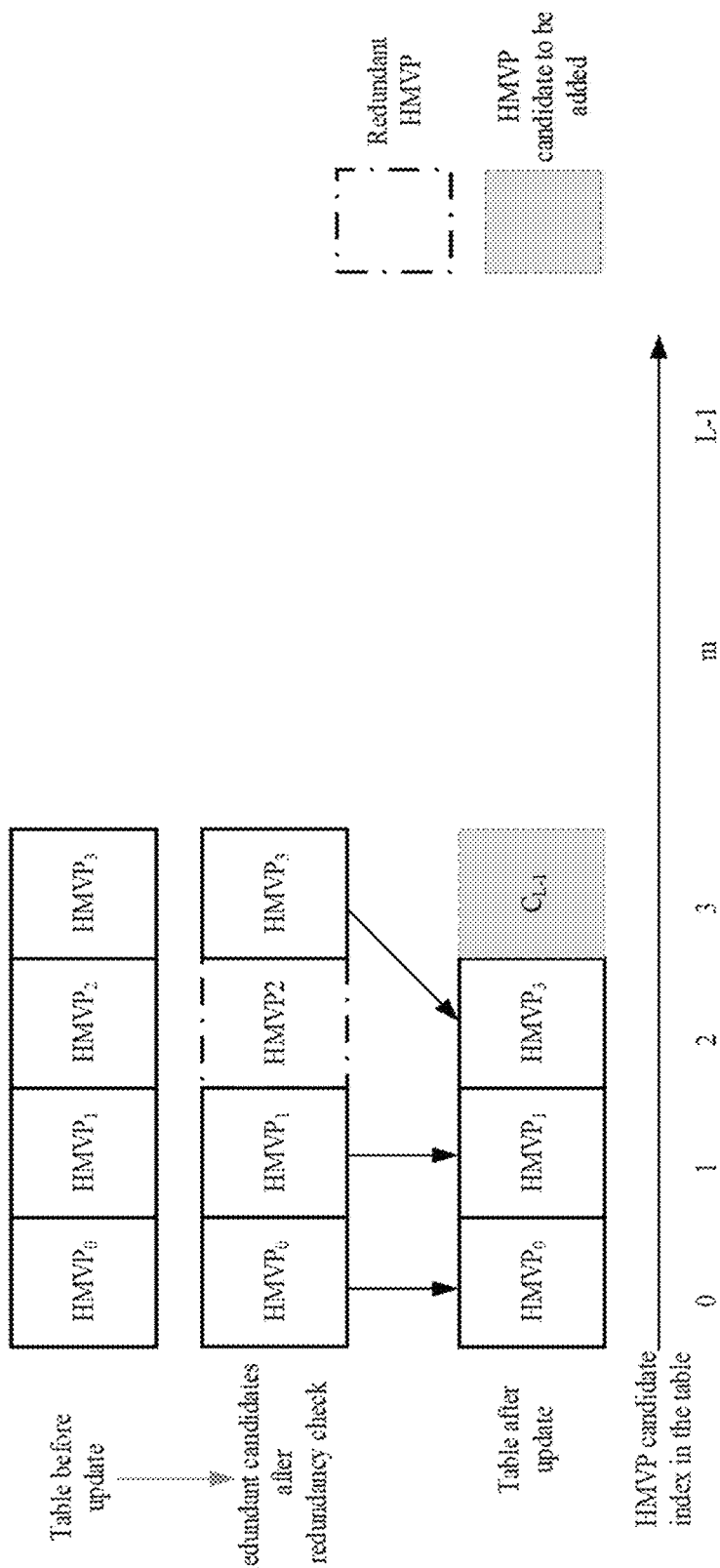

FIG. 32 shows an example when the LUT is not full before adding a new motion candidate.

FIGS. 31 and 32 together show an example of redundancy-removal based LUT updating method (with one redundancy motion candidate removed).

Figure 33:
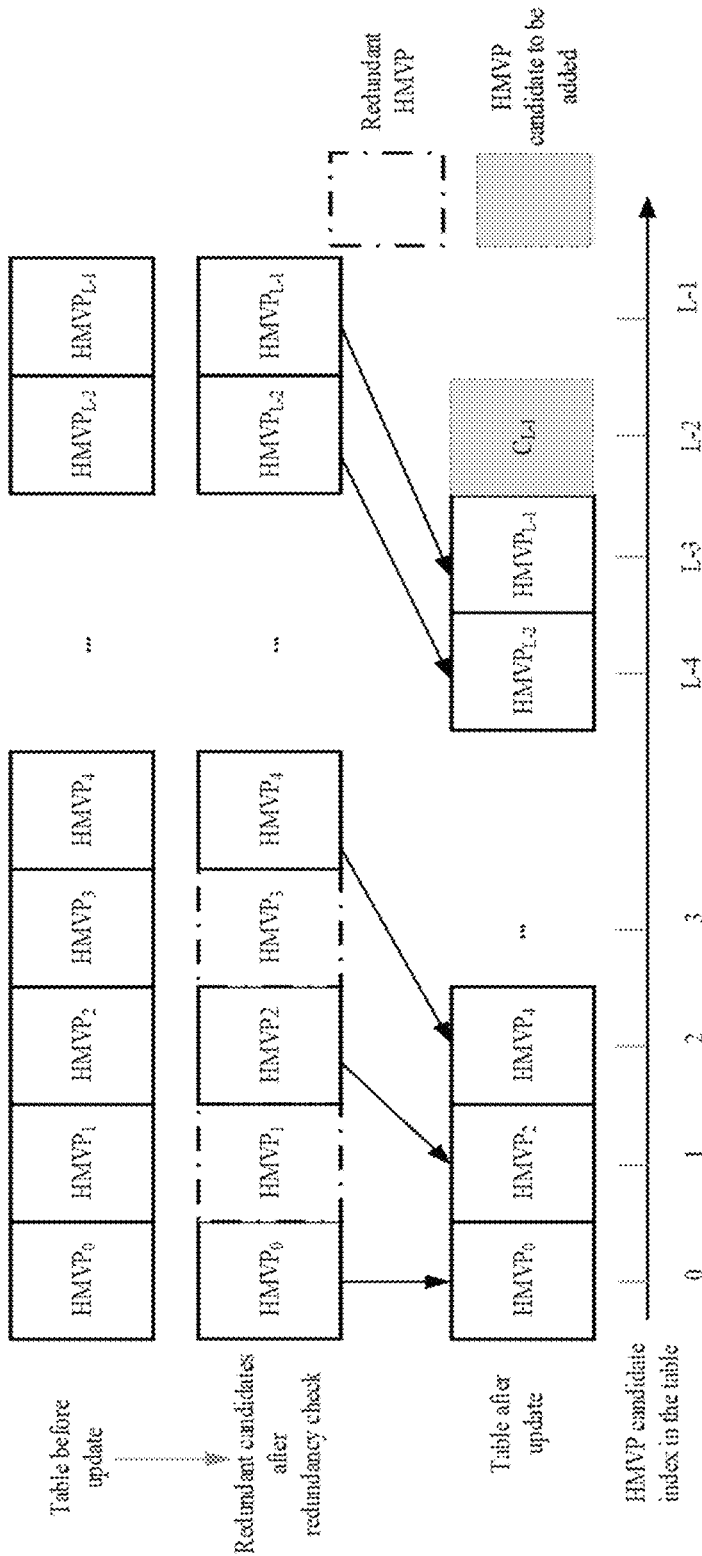
FIG. 33 and FIG. 34 show examples of a redundancy-removal based LUT updating method (with multiple redundancy motion candidates removed).
Figure 34:
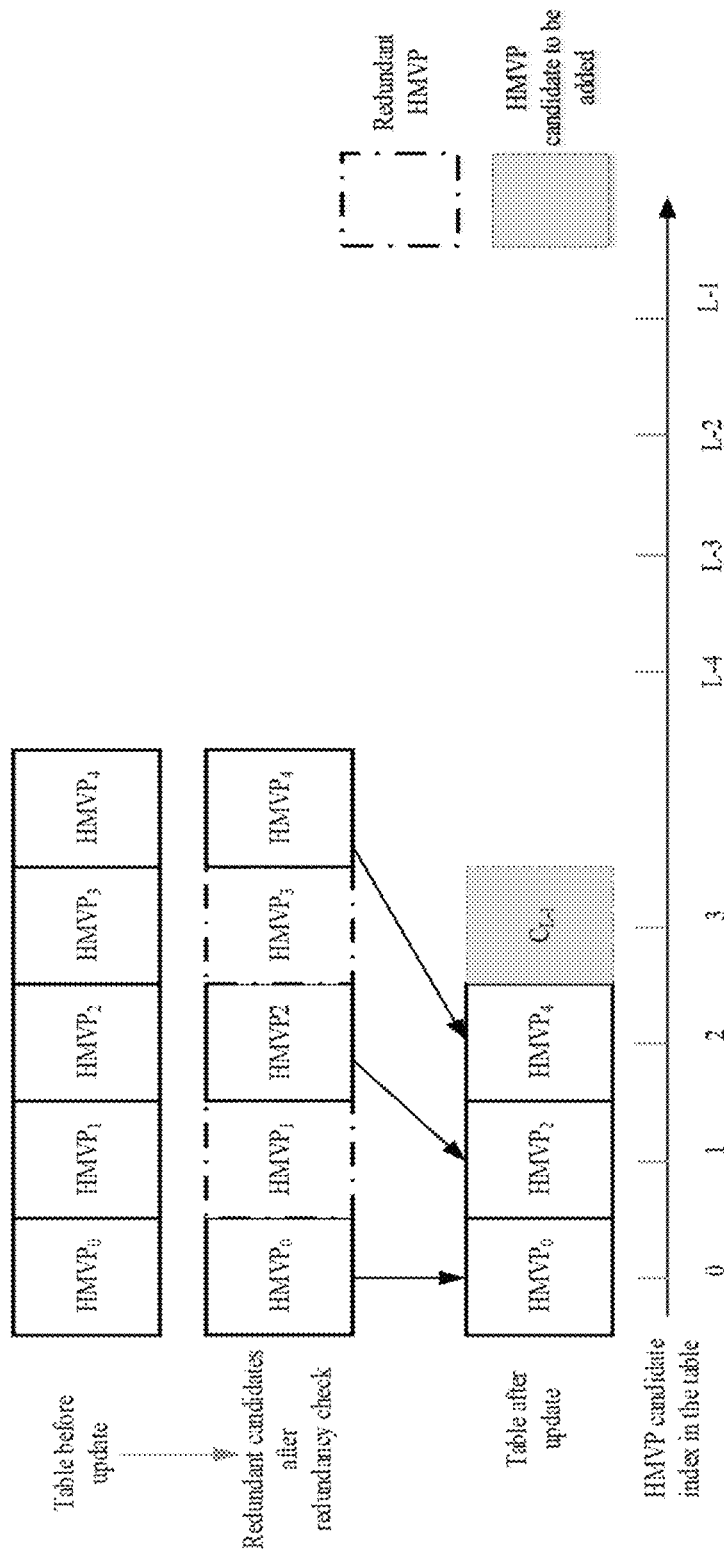

FIGS. 33 and 34 show example implementation for two cases of the redundancy-removal based LUT updating method (with multiple redundancy motion candidates removed, 2 candidates in the figures)

FIG. 33 shows an example case of when the LUT is full before adding a new motion candidate.

FIG. 34 shows an example case of When the LUT is not full before adding a new motion candidate.

HMVP candidates could be used in the merge candidate list construction process. All HMVP candidates from the last entry to the first entry (or the last K0 HMVP, e.g., K0 equal to 16 or 6) in the table are inserted after the TMVP candidate. Pruning is applied on the HMVP candidates. Once the total number of available merge candidates reaches the signaled maximally allowed merge candidates, the merge candidate list construction process is terminated. Alternatively, once the total number of added motion candidates reaches a given value, the fetching of motion candidates from LUTs is terminated.

Similarly, HMVP candidates could also be used in the AMVP candidate list construction process. The motion vectors of the last K1 HMVP candidates in the table are inserted after the TMVP candidate. Only HMVP candidates with the same reference picture as the AMVP target reference picture are used to construct the AMVP candidate list. Pruning is applied on the HMVP candidates. In one example, K1 is set to 4.

Figure 28:
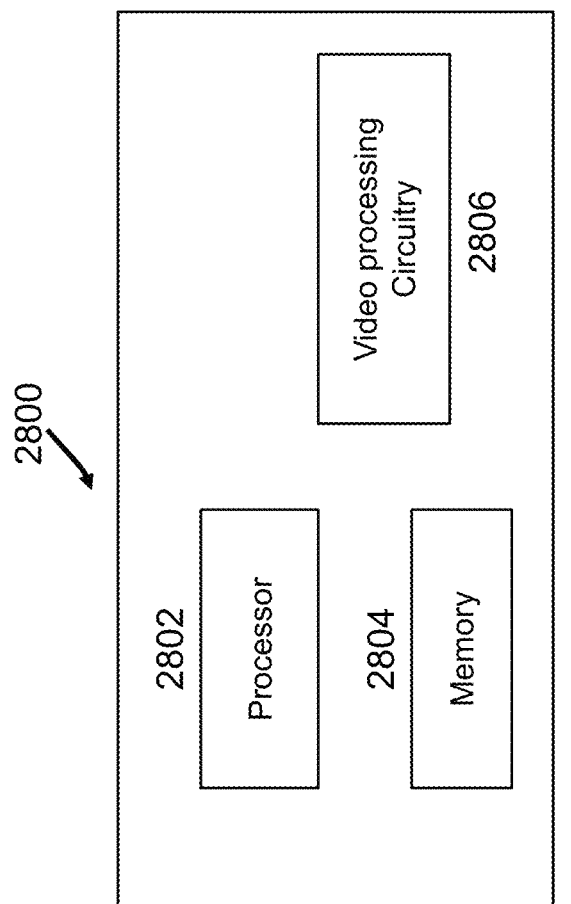
FIG. 28 is a block diagram of an example of a hardware platform for implementing a visual media decoding or a visual media encoding technique described in the present document.

FIG. 28 is a block diagram of a video processing apparatus 2800. The apparatus 2800 may be used to implement one or more of the methods described herein. The apparatus 2800 may be embodied in a smartphone, tablet, computer, Internet of Things (IoT) receiver, and so on. The apparatus 2800 may include one or more processors 2802, one or more memories 2804 and video processing hardware 2806. The processor(s) 2802 may be configured to implement one or more methods described in the present document. The memory (memories) 2804 may be used for storing data and code used for implementing the methods and techniques described herein. The video processing hardware 2806 may be used to implement, in hardware circuitry, some techniques described in the present document.

Figure 26:
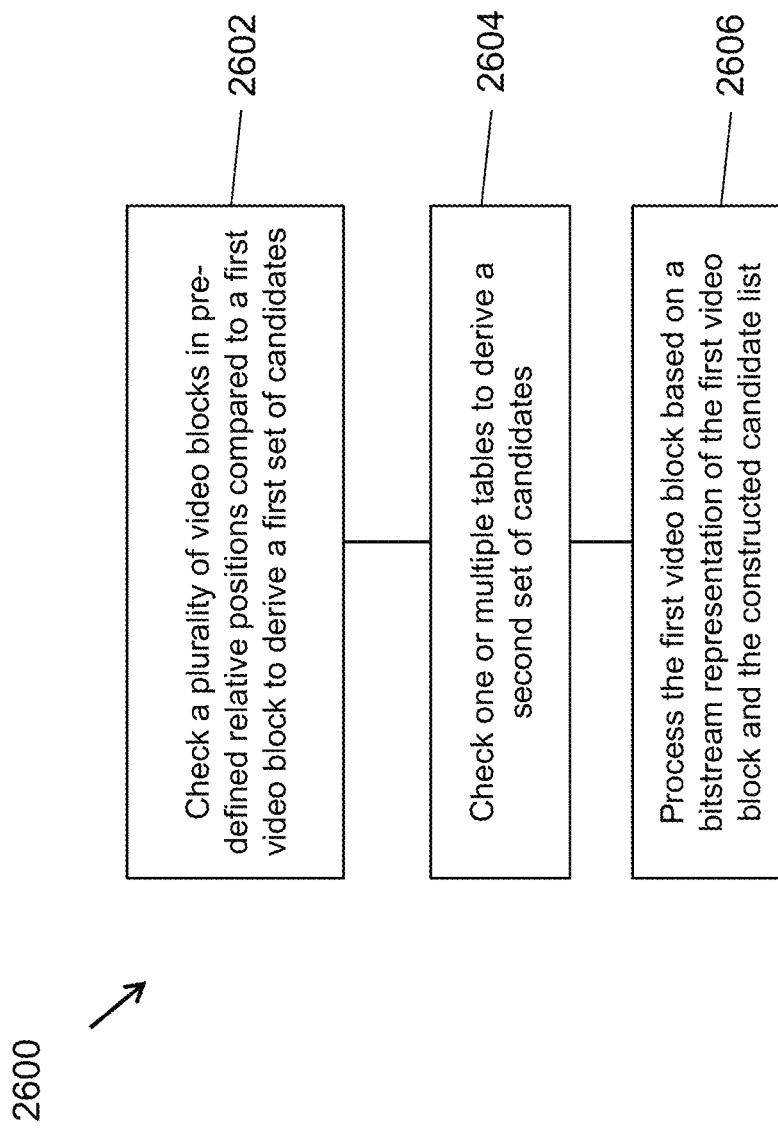
FIG. 26 is a flowchart for an example of a candidate list construction process.

FIG. 26 is a flowchart for an example of a video decoding method 2600. The method 2600 includes checking (2602) one or more video blocks in pre-defined relative positions compared to a first video block to derive a first set of candidates, wherein each of the first set of candidates is derived from corresponding motion information of the one or more video blocks checked. The method 2600 includes checking (2604), upon a determination that a number of the first set of candidates has not reached a predetermined limit, one or multiple tables (e.g., look-up tables) to derive a second set of candidates. The method 2600 includes processing (2606) the first video block based on a bitstream representation of the first video block and the constructed candidate list.

In some embodiments, the processing 2606 may include decoding the bitstream representation to generate pixel values of the bitstream representation of the first video block. In some embodiments, the processing 2606 may include encoding (or transcoding) pixel values of the first video block into corresponding bitstream representation (e.g., transformed residual coefficients) of the first video block. In some embodiments, after the checking operations 2602 or 2604, the method 2600 may determine that no candidates are available for adding to the candidate list. For example, the first set and/or the second set may be empty sets.

Some additional features of the method 2600 are described in item C2.(c)(v) in the previous section and further described below.

In some embodiments, the candidate list includes a merge candidate list.

In some embodiments, the candidate list includes an advanced motion vector prediction (AMVP) candidate list.

In some embodiments, the plurality of video blocks in the pre-defined relative positions compared to the first video block includes video blocks located in a current picture covering the first video block.

In some embodiments, the plurality of video blocks in the pre-defined relative positions compared to the first video block includes video blocks located in a picture different from a current picture covering the first video block.

In some embodiments, the first set of candidates includes at least one of adjacent spatial merge candidates derived from adjacent spatial neighboring video blocks, non-adjacent spatial merge candidates derived from adjacent spatial neighboring video blocks, temporal merge candidates, merge candidates for temporal motion vector prediction (TMVP) candidate, spatial-temporal motion vector prediction (STMVP) merge candidates, or alternative temporal motion vector prediction (ATMVP) merge candidates.

In some embodiments, the first set of candidates includes at least one of adjacent spatial advanced motion vector prediction (AMVP) candidates derived from adjacent spatial neighboring video blocks, non-adjacent spatial AMVP candidates derived from adjacent spatial neighboring video blocks, temporal AMVP candidates, or merge candidates for temporal motion vector prediction (TMVP) candidate.

In some embodiments, the first set of candidates are derived from at least one of merge derivation processes of a High Efficiency Video Coding (HEVC) design or a Joint Exploration Model (JEM) design.

In some embodiments, the second set of candidates includes History-based Motion Vector Prediction (HMVP) candidates.

In some embodiments, the predetermined limit is obtained by subtracting a threshold value from a maximum number of allowable merge candidates for merge candidate list.

In some embodiments, the predetermined limit is obtained by subtracting a threshold value from a maximum number of allowable AMVP candidates for AMVP candidate list.

In some embodiments, the threshold value is set to 1. In some embodiments, the threshold value is set to 0.

In some embodiments, the threshold value is signaled in at least one of a Sequence Parameter Set (SPS), a Picture Parameter Set (PPS), a sequence header, a picture header, a slice header, or a tile header.

In some embodiments, the threshold value is adjusted such that different video blocks have different threshold values.

In some embodiments, the threshold value is determined based on at least one of a block size, a block shape, or a slice type.

In some embodiments, the threshold value is determined based on a maximum number of allowable merge candidates.

In some embodiments, the threshold value is determined based on a type of the first set of candidates.

In some embodiments, the type of the first set of candidates that is used to determine the threshold value includes at least one of a spatial candidates type or a non-adjacent merge candidates type.

In some embodiments, indices for the tables are signaled in a bit field included in one or more of a Video Parameter Set, a Sequence Parameter Set, a Picture Parameter Set, a Slice Header, or a tile header.

In some embodiments, indices for the one or multiple tables are signaled in a bit field corresponding to one or more of: a Coding Tree Unit or a Coding Tree Block Unit or a Coding Unit or a Prediction Unit.

In some embodiments, the processing includes performing a merge list derivation process selectively using at least some of the candidates.

In some embodiments, the processing includes selectively using the candidates from one or more tables in case that a merge candidate list is not full after temporal motion vector predictors are added to the merge candidate list.

In some embodiments, the processing includes performing affine merge mode encoding selectively depending on an affine flag decoded from the bitstream representation.

In some embodiments, the processing includes performing an Advanced Motion Vector Prediction (AMVP) derivation process selectively using at least some of the first set of candidates or the second set of candidates.

In some embodiments, the AMVP process uses the second set of candidates from one or multiple tables in case that an AMVP candidate list is not full after temporal motion vector predictors are added to the AMVP candidate list.

In some embodiments, the processing includes using tables that include candidates that have a reference picture that is same as a current reference picture for the current video block.

Figure 27:
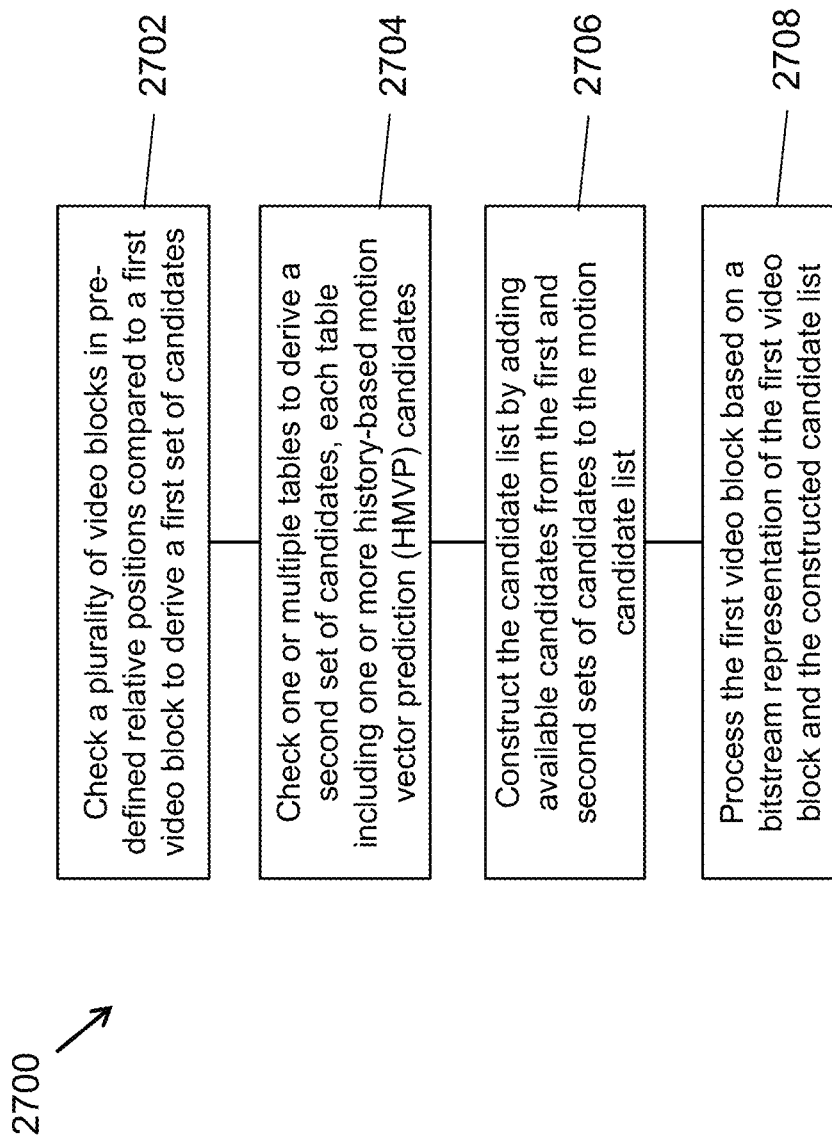
FIG. 27 is a flowchart for another example of a candidate list construction process.

FIG. 27 is a flowchart for an example of video decoding method 2700. The method 2700 checking (2702) a plurality of video blocks in pre-defined relative positions compared to a first video block to derive a first set of candidates, wherein each of the first set of candidates is derived from corresponding motion information of the video blocks, checking (2704), upon a determination that a number of the first set of candidates has not reached a predetermined limit, one or multiple tables (e.g., look-up tables) to derive a second set of candidates, each table including one or more history-based motion vector prediction (HMVP) candidates based on motion information of a previously coded block, adding (2706) the first and second sets of candidates to the candidate list, and processing (2708) the first video block based on a bitstream representation of the first video block and the constructed candidate list.

In some embodiments, the processing 2708 may include decoding the bitstream representation to generate pixel values of the bitstream representation of the first video block. In some embodiments, the processing 2708 may include encoding (or transcoding) pixel values of the first video block into corresponding bitstream representation (e.g., transformed residual coefficients) of the first video block. In some embodiments, after the checking operations 2702 or 2704, the method 2700 may determine that no candidates are available for adding to the table. For example, the first set and/or the second set may be empty sets. In such cases, the adding 2706 may result in no change to the existing candidate list.

Some additional features of the method 2700 are described in item C2.(c)(v) in the previous section and further described below.

In some embodiments, the plurality of video blocks in the pre-defined relative positions compared to the first video block includes video blocks located in a current picture covering the first video block.

In some embodiments, the plurality of video blocks in the pre-defined relative positions compared to the first video block includes video blocks located in a picture different from a current picture covering the first video block.

In some embodiments, the candidate list includes a merge candidate list.

In some embodiments, the candidate list includes a candidate from an advanced motion vector prediction (AMVP) motion candidate list.

In some embodiments, the first set of candidates includes at least one of an adjacent spatial merge candidate derived from an adjacent spatial neighboring video block, a non-adjacent spatial merge candidate derived from a non-adjacent spatial neighboring video block, a temporal merge candidate, a merge candidate for a temporal motion vector prediction (TMVP) candidate, a spatial-temporal motion vector prediction (STMVP) merge candidate, or an alternative temporal motion vector prediction (ATMVP) merge candidate.

In some embodiments, the first set of candidates is derived from at least one of a merge derivation process of a High Efficiency Video Coding (HEVC) design or a Joint Exploration Model (JEM) design.

In some embodiments, the predetermined limit is obtained by subtracting a threshold value from a maximum number of allowable merge candidates for the merge candidate list.

In some embodiments, the threshold value is set to 1. In some embodiments, the threshold value is set to 0.

In some embodiments, the threshold value is signaled in at least one of a Sequence Parameter Set (SPS), a Picture Parameter Set (PPS), a sequence header, a picture header, a slice header, or a tile header.

In some embodiments, the threshold value is adjusted such that different video blocks have different threshold values.

In some embodiments, the threshold value is determined based on at least one of a block size, a block shape, or a slice type.

In some embodiments, the threshold value is determined based on a maximum number of allowable merge candidates.

In some embodiments, the threshold value is determined based on a type of the first set of candidates.

In some embodiments, the type of the first set of candidates that is used to determine the threshold value includes at least one of a spatial candidate type or a non-adjacent merge candidate type.

In some embodiments, the checking is performed based on a rule that defines s termination criteria for terminating the candidates that are checked.

In some embodiments, the rule includes terminating upon reaching a maximum allowed number of merge or AMVP candidate list minus a threshold.

In some embodiments, the maximum allowed number is pre-signaled in the bitstream.

In some embodiments, the checking of the one or multiple tables includes checking the multiple HMVP candidates from the one or multiple tables in case that a number of spatial or temporal merge candidates that have been put in the merge candidate list is less than a maximum allowed merge candidates minus a given threshold.

In some embodiments, the threshold is 1 or wherein the threshold is signaled in the bitstream or the threshold is pre-defined in a header in the bitstream representation.

In some embodiments, the threshold is adaptively changed on a block by block basis.

In some embodiments, only a specific kind of merge candidates are used when comparing with the threshold.

In some embodiments, an HMVP candidate is a motion candidate from a table wherein the table includes a set of motion candidates, wherein each motion candidate in the set of motion candidates is associated with a corresponding motion information.

In some embodiments, the motion information includes at least one of: a prediction direction, a reference picture index, motion vector values, an intensity compensation flag, an affine flag, a motion vector difference precision, and a motion vector difference value.

In some embodiments, a video encoder or transcoder may implement the above-described methods. In some embodiments, a video decoder may implement the above described method. In some embodiments, the techniques may be embodiment in the form of a computer readable medium having processor executable instructions stored on it. The instructions, when executed by the processor, will cause the processor to implement a method described in the present document.

Some additional examples of the method 2600 are described in item C2(5)(c)(v) and C4(7)(g). For example various variables such as $N_{avaiMCinLUT}$, $NUM_{maxMC}$, $N_{avaiC}$ are discussed with respect to various embodiments in which maximum numbers, minimum values, and so on, as described with respect to the method 2700 are used.

Figure 35:
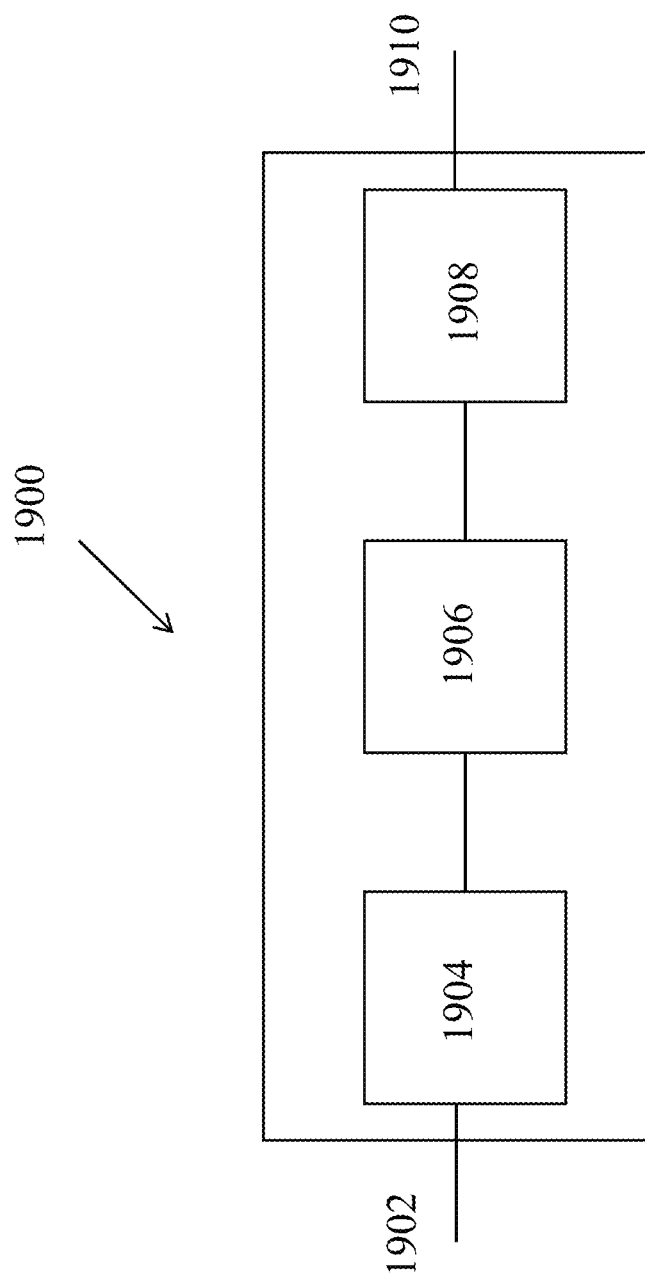
FIG. 35 is a block diagram of an example video processing system in which disclosed techniques may be implemented.

FIG. 35 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for processing video data, comprising:
   constructing a motion candidate list for a conversion between a first video block and a bitstream of the first video block; and
   performing the conversion based on the constructed motion candidate list;
   wherein the constructing of the motion candidate list comprises:
   checking, upon a determination that a number of a first set of motion candidates has not reached a predetermined limit, one or more motion candidates in a table of one or multiple tables to determine a second set of motion candidates to be added into the motion candidate list;
   wherein each table of the one or multiple tables comprises motion candidates derived from previous video blocks that are processed prior to the first video block, and arrangement of the motion candidates in the each table is based on a sequence of addition of the motion candidates into the table; and
   wherein one or more video blocks in pre-defined relative positions compared to the first video block are checked to derive the first set of motion candidates before the checking of the one or more motion candidates of the table, and wherein each of the first set of motion candidates is derived from motion information of a corresponding video block of the one or more video blocks;
   wherein the predetermined limit is obtained based on a threshold value, and the threshold value is adaptively changed.

2. The method of claim 1, wherein the performing a conversion comprises:
   decoding the first video block from the bitstream.

3. The method of claim 1, wherein the performing a conversion comprises:
   encoding the first video block into the bitstream.

4. The method of claim 1, wherein the first set of motion candidates are added into the motion candidate list before the checking of the one or more motion candidates in the table.

5. The method of claim 1, wherein the table is a history-based motion vector prediction (HMVP) table and comprises at least one HMVP motion candidate.

6. The method of claim 1, wherein the predetermined limit is obtained by subtracting the threshold value from a maximum number of allowable motion candidates for the motion candidate list.

7. The method of claim 6, wherein the threshold value is pre-defined.

8. The method of claim 6, wherein the threshold value is a positive value.

9. The method of claim 8, wherein the motion candidate list is a merge motion candidate list.

10. The method of claim 6, wherein the threshold value is one of 0 or 1.

11. The method of claim 1, wherein the motion candidate list is an advanced motion vector prediction (AMVP) motion candidate list, and in response to a number of the first set of motion candidates in the motion candidate list being less than a maximum number of allowable motion candidates for the motion candidate list, the table is checked.

12. The method of claim 6, wherein the threshold value is determined based on at least one of a block size, a block shape, or a slice type, or a maximum number of allowable motion candidates in the motion candidate list, a type of the first set of motion candidates.

13. The method of claim 6, wherein the threshold value is signaled in the bitstream.

14. The method of claim 13, wherein the threshold value is signaled in at least one of a Sequence Parameter Set (SPS), a Picture Parameter Set (PPS), a sequence header, a picture header, a slice header, or a tile header.

15. The method of claim 6, wherein the threshold value is adaptively changed on a block by block basis.

16. The method of claim 6, wherein the maximum number of allowable motion candidates for the motion candidate list is pre-signaled in the bitstream.

17. The method of claim 1, wherein the one or more video blocks in the pre-defined relative positions compared to the first video block include at least one of: a video block located in a current picture covering the first video block or a video block located in a picture different from a current picture covering the first video block.

18. The method of claim 1, wherein the checking of one or more video blocks in pre-defined relative positions compared to a first video block comprises:
checking a given spatial block which is located in a current picture covering the first video block; and
checking a temporal block which is located in a picture different from the current picture covering the first video block, after the checking of the given spatial block.

19. The method of claim 1, wherein the first set of motion candidates comprises at least one of:
a spatial motion candidate derived from a given spatial block which is located in a current picture covering the first video block; or
an TMVP motion candidate derived from a temporal block which is located in a picture different from the current picture covering the first video block.

20. The method of claim 1, wherein the first set of motion candidates includes at least one of an adjacent temporal merge motion candidate derived from an adjacent temporal neighboring video block, a non-adjacent temporal merge motion candidate derived from a non-adjacent temporal neighboring video block, an adjacent spatial merge motion candidate derived from an adjacent spatial neighboring video block, a non-adjacent spatial merge motion candidate derived from a non-adjacent spatial neighboring video block, a temporal motion vector prediction (TMVP) candidate, a spatial-temporal motion vector prediction (STMVP) motion candidate, or an alternative temporal motion vector prediction (ATMVP) motion candidate.

21. The method of claim 1, wherein an index of the table to be checked is signaled in a bit field included in one or more of a Video Parameter Set, a Sequence Parameter Set, a Picture Parameter Set, a Slice Header, or a tile header, or at least one bitfield corresponding to one or more of: a Coding Tree Unit or a Coding Tree Block Unit or a Coding Unit or a Prediction Unit.

22. The method of claim 1, wherein the motion information of the motion candidate in the table comprises at least one of: position information of a video block from which the motion candidate is derived, shape information of a video block from which the motion candidate is derived, a prediction direction, a reference picture index, motion vector values, an intensity compensation flag, an affine flag, a motion vector difference precision, and a motion vector difference value.

23. A video processing apparatus comprising a processor and a non-transitory memory with instructions thereon, wherein the instructions upon execution by the processor, cause the processor to:
construct a motion candidate list for a conversion between a first video block and a bitstream of the first video block; and
perform the conversion based on the constructed motion candidate list;
wherein the constructing of the motion candidate list comprises:
checking, upon a determination that a number of a first set of motion candidates has not reached a predetermined limit, one or more motion candidates in a table of one or multiple tables to determine a second set of motion candidates to be added into the motion candidate list;
wherein each table of the one or multiple tables comprises motion candidates derived from previous video blocks that are processed prior to the first video block, and arrangement of the motion candidates in the each table is based on a sequence of addition of the motion candidates into the table; and
wherein one or more video blocks in pre-defined relative positions compared to the first video block are checked to derive the first set of motion candidates before the checking of the one or more motion candidates of the table, and wherein each of the first set of motion candidates is derived from motion information of a corresponding video block of the one or more video blocks;
wherein the predetermined limit is obtained based on a threshold value, and the threshold value is adaptively changed.

24. A non-transitory computer-readable storage medium storing instructions that cause a processor to:
construct a motion candidate list for a conversion between a first video block and a bitstream of the first video block; and
perform the conversion based on the constructed motion candidate list;
wherein the constructing of the motion candidate list comprises:
checking, upon a determination that a number of a first set of motion candidates has not reached a predetermined limit, one or more motion candidates in a table of one or multiple tables to determine a second set of motion candidates to be added into the motion candidate list;
wherein each table of the one or multiple tables comprises motion candidates derived from previous video blocks that are processed prior to the first video block, and arrangement of the motion candidates in the each table is based on a sequence of addition of the motion candidates into the table; and
wherein one or more video blocks in pre-defined relative positions compared to the first video block are checked to derive the first set of motion candidates before the checking of the one or more motion candidates of the table, and wherein each of the first set of motion candidates is derived from motion information of a corresponding video block of the one or more video blocks;
wherein the predetermined limit is obtained based on a threshold value, and the threshold value is adaptively changed.

25. A non-transitory computer-readable recording medium storing a bitstream which is generated by a method performed by a video processing apparatus, wherein the method comprises:

constructing a motion candidate list for a conversion between a first video block and a bitstream of the first video block; and performing the conversion based on the constructed motion candidate list;

wherein the constructing of the motion candidate list comprises:

checking, upon a determination that a number of a first set of motion candidates has not reached a predetermined limit, one or more motion candidates in a table of one or multiple tables to determine a second set of motion candidates to be added into the motion candidate list;

wherein each table of the one or multiple tables comprises motion candidates derived from previous video blocks that are processed prior to the first video block, and arrangement of the motion candidates in the each table is based on a sequence of addition of the motion candidates into the table; and wherein one or more video blocks in pre-defined relative positions compared to the first video block are checked to derive the first set of motion candidates before the checking of the one or more motion candidates of the table, and wherein each of the first set of motion candidates is derived from motion information of a corresponding video block of the one or more video blocks;

wherein the predetermined limit is obtained based on a threshold value, and the threshold value is adaptively changed.

* * * * *